United States Patent
Cho et al.

(10) Patent No.: US 10,158,456 B2
(45) Date of Patent: Dec. 18, 2018

(54) MODEM CHIP FOR PERFORMING HYBRID AUTOMATIC REPEAT REQUEST PROCESSING, APPLICATION PROCESSOR INCLUDING THE MODEM CHIP, AND OPERATING METHOD OF THE MODEM CHIP

(71) Applicant: Samsung Electronics Co., Ltd., Suwon-si, Gyeonggi-do (KR)

(72) Inventors: Hyun-sang Cho, Seoul (KR); Hyun-young Oh, Anyang-si (KR); In-chul Song, Ansan-si (KR); Yong-chan Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/676,006

(22) Filed: Aug. 14, 2017

(65) Prior Publication Data
US 2018/0183549 A1   Jun. 28, 2018

(30) Foreign Application Priority Data
Dec. 22, 2016   (KR) .................. 10-2016-0176845

(51) Int. Cl.
| *H04L 1/08*  | (2006.01) |
| *H04L 1/18*  | (2006.01) |
| *H04B 1/38*  | (2015.01) |
| *H04L 12/26* | (2006.01) |
| *H04L 29/08* | (2006.01) |

(52) U.S. Cl.
CPC ............ *H04L 1/1812* (2013.01); *H04B 1/38* (2013.01); *H04L 43/16* (2013.01); *H04L 69/324* (2013.01)

(58) Field of Classification Search
CPC .... H04L 1/1912; H04L 1/1816; H04L 1/1819
USPC ......................... 375/222, 357; 714/748, 751
See application file for complete search history.

(56) References Cited

U.S. PATENT DOCUMENTS

| 7,949,012 | B2 | 5/2011 | Chang et al. |
| 8,060,801 | B2 | 11/2011 | Seol et al. |
| 9,026,883 | B2 | 5/2015 | Lo et al. |
| 9,078,236 | B2 | 7/2015 | Chun et al. |
| 9,197,365 | B2 | 11/2015 | Felix et al. |
| 9,204,437 | B2 | 12/2015 | Smee et al. |
| 9,262,350 | B2 | 2/2016 | Rajamani et al. |
| 2009/0086657 | A1 | 4/2009 | Alpert et al. |
| 2014/0344638 | A1 | 11/2014 | Taguchi et al. |
| 2015/0113360 | A1 | 4/2015 | Lee et al. |
| 2016/0241362 | A1 | 8/2016 | El-Khamy et al. |

*Primary Examiner* — Kevin Kim
(74) *Attorney, Agent, or Firm* — Harness, Dickey & Pierce, P.L.C.

(57) ABSTRACT

Provided are a modem chip for performing hybrid automatic repeat request (HARQ) processing, an application processor including the modem chip, and an operating method of the modem chip. A modem chip for receiving data of a codeword unit including a plurality of codeblock units includes a HARQ controller for controlling HARQ data of the codeword unit to be saved in an external memory based on an error detection result of the codeword unit, a HARQ mover for saving or fetching the HARQ data of the codeword unit in or from the external memory via a bus interface, and a HARQ combiner for combining retransmitted data with the HARQ data fetched from the external memory.

20 Claims, 22 Drawing Sheets

MODEM CHIP FOR PERFORMING HYBRID AUTOMATIC REPEAT REQUEST PROCESSING, APPLICATION PROCESSOR INCLUDING THE MODEM CHIP, AND OPERATING METHOD OF THE MODEM CHIP

CROSS-REFERENCE TO RELATED APPLICATION

This U.S. non-provisional application claims the benefit of priority under 35 U.S.C. § 119 to Korean Patent Application No. 10-2016-0176845, filed on Dec. 22, 2016, in the Korean Intellectual Property Office (KIPO), the disclosure of which is incorporated herein in its entirety by reference.

BACKGROUND

Various example embodiments of the inventive concepts relate to a modem chip and, more particularly, to a modem chip for performing hybrid automatic repeat request (HARQ) processing, an application processor including the modem chip, and/or an operating method of the modem chip.

A HARQ process is a data transmission scheme capable of solving an upper layer time delay problem related to an automatic repeat request (ARQ) process execution, where the HARQ process performs additional channel coding to utilize an error packet, and is used in various mobile communication standards, e.g., high-speed packet access (HSPA), long term evolution (LTE), etc., standards. In a HARQ process, since previously received and saved HARQ data is combined with retransmitted data, memory (e.g., HARQ memory) for saving the previously received HARQ data is necessary.

Since the data transmission speed of mobile communication is increased, the size of the HARQ memory for saving the HARQ data also needs to be increased accordingly. When the HARQ memory included in a modem chip, or an application processor including the modem chip in the form of an on-die chip, due to the increase in the size of the HARQ memory, the sizes of the modem chip and the application processor may be increased and manufacturing costs may also be increased. In addition, since the number of accesses to the HARQ memory is increased, power consumption may also be increased.

SUMMARY

Various example embodiments of the inventive concepts provide a modem chip for efficiently saving and fetching hybrid automatic repeat request (HARQ) data by using an internal and an external memory, an application processor including the modem chip, and/or an operating method of the modem chip.

According to an aspect of at least one example embodiment of the inventive concepts, there is provided a modem chip for receiving data, the data including at least one codeword unit, the codeword unit including a plurality of codeblock units, the modem chip including a hybrid automatic repeat request (HARQ) controller configured to control HARQ data, the HARQ data including at least one codeword unit, to be saved in an external memory based on an error detection result associated with the codeword unit, a HARQ mover configured to save or fetch the HARQ data of the codeword unit in or from the external memory via a bus interface, and a HARQ combiner configured to combine retransmission data with the HARQ data fetched from the external memory.

According to another aspect of at least one example embodiment of the inventive concepts, there is provided a modem chip for accessing an external memory, the modem chip including a hybrid automatic repeat request (HARQ) mover configured to save or fetch HARQ data in or from the external memory via a bus interface with the external memory, a HARQ combiner configured to combine retransmitted data with the HARQ data fetched from the external memory, and a HARQ controller configured to determine whether a timeout occurs when the external memory is accessed, and control a HARQ combining operation of the HARQ combiner based on a result of the determination.

According to another aspect of at least one example embodiment of the inventive concepts, there is provided an operating method of a modem chip, the method including receiving data including at least one codeword unit, the codeword unit including a plurality of codeblock units, performing an error detection operation on the codeblock units and the codeword unit of the received data, when an error detection result of at least one of the codeblock units and the codeword unit indicates failure, saving HARQ data corresponding to the data of the codeword unit in an external memory, and fetching the HARQ data from the external memory to combine the HARQ data with retransmitted data.

According to another aspect of at least one example embodiment of the inventive concepts, there is provided a modem chip including an internal memory having a storage capacity smaller than an external memory, and at least one processor configured to execute computer readable instructions to receive a transmission of data from a transmission source, the data having a length of at least one codeword unit, analyze the received data, and save the data as a first HARQ data in the internal memory or in the external memory based on results of the analyzing the data.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
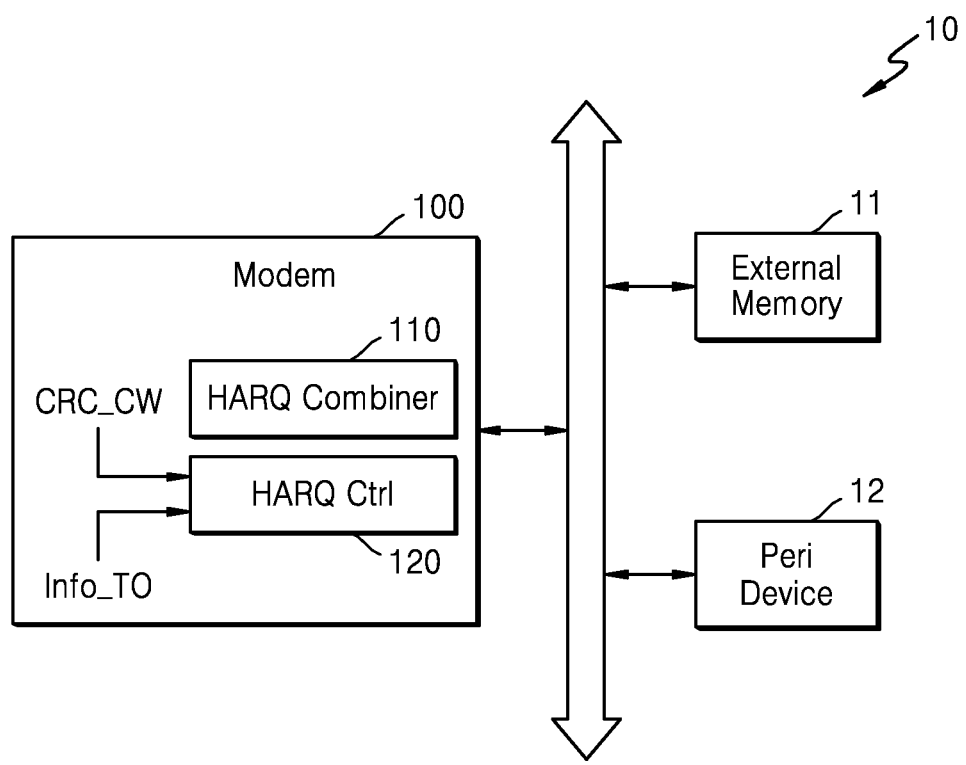
FIG. 1 is a block diagram of a communication system according to at least one example embodiment of the inventive concepts.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. The drawings are not drawn to scale and the sizes and thicknesses of various elements may be exaggerated for clarity. Like reference characters and/or numerals in the drawings denote like elements, and thus their description may be omitted.

FIG. 1 is a block diagram of a communication system 10 according to at least one example embodiment of the inventive concepts.

Referring to FIG. 1, the communication system 10 may be one of various communication devices performing communication, and may collectively include mobile and/or stationary user devices, e.g., a user equipment (UE), a mobile station (MS), and an advanced mobile station (AMS), etc. Examples of the user devices include a smartphone, a tablet, a personal computer (PC), a mobile phone, a video phone, an e-book reader, a netbook PC, an Internet of Things (IoT) device, a virtual reality device, an augmented reality device, a gaming console, a wearable device, a smart device, etc. The communication system 10 may be a transmission system for transmitting data and/or a reception system for receiving data.

The communication system 10 may include a modem 100 for processing baseband signals, an external memory 11 provided outside the modem 100, and at least one peripheral device 12. The modem 100 may be a modem chip configured as an individual semiconductor chip and mounted in the communication system 10, but is not limited thereto. The communication system 10 may further include a radio-frequency (RF) chip (not shown), and the RF chip may be connected to an antenna to process high-frequency signals. For example, the RF chip may convert a high-frequency signal received via an antenna, into a low-frequency signal, and transmit the converted low-frequency signal to the modem 100. Additionally, the RF chip may receive a low-frequency signal from the modem 100, convert the low-frequency signal into a high-frequency signal, and transmit the converted high-frequency signal to outside via the antenna.

According to at least one example embodiment, an application processor, into which functions of the modem 100 are integrated, may be provided, and the modem 100 may be included in the application processor. In this case, the above-described modem chip may also be referred to as the application processor.

According to at least one example embodiment, the external memory 11 illustrated in FIG. 1 may be a memory accessible by the modem 100 and the peripheral device 12 via a common bus. For example, the external memory 11 may be configured as static random-access memory (SRAM), dynamic random-access memory (DRAM), synchronous DRAM (SDRAM), double data rate (DDR) SDRAM, etc. The peripheral device 12 may be a device included in the communication system 10 to access the external memory 11. For example, the peripheral device 12 may be one of various types of devices for processing data, e.g., a complementary metal-oxide-semiconductor (CMOS) image sensor, a central processing unit (CPU), etc. When the communication system 10 includes an application processor and the modem 100 is configured as a semiconductor chip separate from the application processor, the peripheral device 12 may be the application processor according to some example embodiments.

A hybrid automatic repeat request (HARQ) function is applicable based on various mobile communication standards, e.g., long term evolution (LTE), high-speed packet access (HSPA), 5G, etc., standards. For example, in a HARQ process including soft combining, when an error occurs in previously transmitted data (e.g., data that was transmitted previously in the same communication session), the previously transmitted data (e.g., HARQ data) is saved and then a HARQ retransmission combining operation (also referred to as a retransmission combining operation or a HARQ combining operation) is performed using (e.g., combining) the retransmitted data (e.g., the previously transmitted data) and the HARQ data, thereby generating one combined data. In this case, the combined data may have a higher reliability compared to the initially transmitted data or the retransmitted data because the amount of information is increased due to the combining. In general, a cyclic redundancy check (CRC) code may be used to perform an error detection operation for determining whether to retransmit the data. However, the example embodiments of the inventive concepts are not limited thereto and error detection may be performed using various other schemes.

For example, based on LTE communication standards, when a downlink data rate from a base station to the communication system 10 is increased, the size of a space required to save HARQ data (e.g., a HARQ memory) is greatly increased. For example, when the data rate is increased, multiple parallel HARQ processes are applied to each of multiple component carriers, and each piece of the HARQ data requires 3 or 4 bits. Therefore, the size of the HARQ memory may be greatly increased considering the above factors.

If an internal memory is included in the modem 100 and used as the HARQ memory instead of an external HARQ memory, the HARQ data may be rapidly saved and fetched (and/or read) and power consumption may be reduced. However, the size of the HARQ memory and the physical size of the modem 100 is greatly increased in order to accommodate the large-sized HARQ data, thus increasing the cost for fabricating the modem 100. Otherwise, if the external memory 11 provided outside the modem 100 is used as the HARQ memory, the size of the modem 100 may be reduced because a large-sized HARQ memory does not need to be included in the modem 100, but power consumption may be increased to access the HARQ data. In addition, since the external memory 11 is accessed via a bus shared with other devices included in the communication system 10 (e.g., an application processor, an image sensor, a graphics processor, etc.), a bus delay time is increased in HARQ data save (e.g., write) and fetch (e.g., read) operations.

According to at least one example embodiment of the inventive concepts, the modem 100 may include a HARQ processing module. When an error occurs in the received data (e.g., when the modem 100 detects an error in the received data), the HARQ processing module may request a transmission system (not shown) to retransmit the data and perform various operations related to a HARQ process. For example, the modem 100 may include a HARQ combiner 110 for combining the retransmitted data with the HARQ data saved in the internal memory and/or the external memory 11 of the modem 100, and a HARQ controller 120 for controlling overall operations of the HARQ process, as elements of the HARQ processing module.

According to at least one example embodiment, the HARQ controller 120 may control an operation of saving and/or fetching the HARQ data in and/or from the external memory 11. In addition, the modem 100 may include a fetch buffer (not shown) configured as, for example, SRAM, DRAM, etc. The fetch buffer of the modem 100 may save (e.g., temporarily save) the HARQ data fetched from the external memory 11 and/or the HARQ data to be saved in the external memory 11, for the HARQ process. The HARQ controller 120 may control an operation of saving and/or reading the HARQ data in and/or from the fetch buffer of the modem 100. According to at least one example embodiment, the fetch buffer may be configured to temporarily save a minimum size of the HARQ data for the HARQ process allowing the fetch buffer to have a small size, the example embodiments are not limited thereto and the fetch buffer may be smaller or greater than the minimum size of the HARQ data for the HARQ process.

According to at least one example embodiment, the modem 100 may include an internal memory (not shown) for saving a part of HARQ data. The fetch buffer may differ from the internal memory in that the fetch buffer saves (e.g., temporarily saves) the HARQ data fetched from the external memory 11 in the HARQ process, whereas the internal memory saves a part of HARQ data allocated thereto separately from the external memory 11.

The HARQ controller 120 may control the HARQ data save/fetch operation in such a manner that the number of accesses to the external memory 11 is reduced, or that degradation in HARQ performance due to a delay time of the common bus is reduced and/or prevented. In addition, the HARQ controller 120 may reduce power consumption and improve HARQ performance by efficiently allocating the HARQ data to the external memory 11 and the internal memory.

According to at least one example embodiment, the HARQ controller 120 may control the HARQ process in a data unit having a certain size (e.g., a desired size). For example, a first data unit having a relatively large size may include a plurality of second data units having a relatively small size, or in other words, the second data units are smaller in size than the first data unit. Information received by the modem 100 may include a CRC code for each of the second data units, and a CRC code for the first data unit.

According to at least one example embodiment, the first data unit may be a codeword unit, and the second data unit may be a codeblock unit. For example, the HARQ data may be saved in the external memory 11 based on an error detection result of data of the codeword unit (also referred to as a codeword or codeword data), and the HARQ controller 120 may control the HARQ data save operation (e.g., store operation, write operation, etc.) based on a CRC check result CRC_CW using the CRC code of the codeword unit. For example, the HARQ controller 120 may save the HARQ data in the external memory 11 in the codeword unit based on the CRC check result CRC_CW. Multiple pieces of codeword data may be provided to the modem 100, and the HARQ controller 120 may selectively save the HARQ data in the external memory 11 in response to the CRC check result CRC_CW.

According to at least one example embodiment, the HARQ controller 120 may control the HARQ data save operation based on a CRC check result using the CRC code of the codeword unit and the CRC code of the codeblock unit. For example, when a CRC check error occurs in any one codeblock unit, the HARQ data corresponding to a codeword unit including the codeblock unit may be saved in the external memory 11. When a CRC check error occurs in at least one unit among a codeword unit and codeblock units included in the codeword unit, the HARQ data corresponding to the codeword unit including the codeblock units may be saved in the external memory 11.

According to at least one example embodiment, the HARQ controller 120 may control the HARQ data save and fetch operations in consideration of a delay time in accessing the external memory 11. For example, when the delay time in accessing, e.g., fetching and/or saving the HARQ data from and/or in, the external memory 11 via the shared bus is increased, HARQ performance may be degraded and performances of other devices that desire to access the external memory 11 via the shared bus may also be degraded. Therefore, the HARQ controller 120 may control the operation of accessing the external memory 11 based on timeout information Info_TO associated with the delay time in accessing the external memory 11. For example, if a timeout occurs when the external memory 11 is accessed, bus occupation may be released and thus a problem of increasing the delay time may be reduced and/or prevented.

According to the afore-described example embodiment, since a large amount of HARQ data is saved in the external memory 11, the size of the modem 100 may be reduced. Furthermore, since the number of accesses to save the HARQ data in the external memory 11 is reduced, power consumption may also be reduced. In addition, degradation in the performances of the modem 100 and/or the peripheral device 12, etc., due to increase in a delay time may be reduced and/or prevented.

Figure 2:
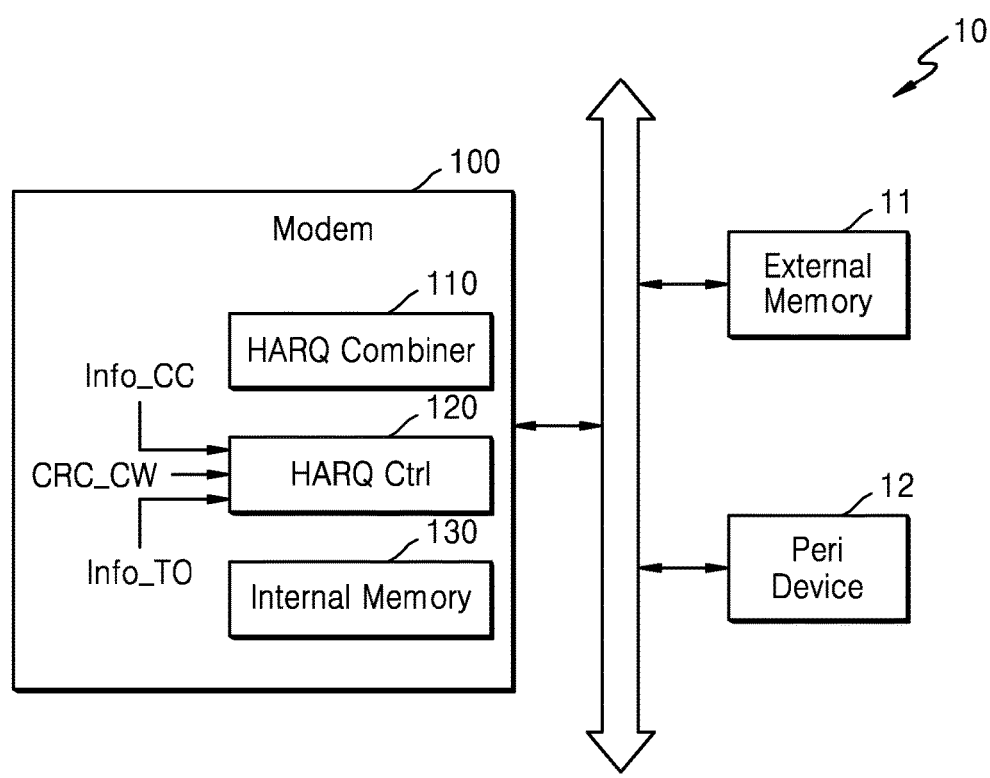
FIG. 2 is a block diagram of a communication system according to at least one example embodiment of the inventive concepts.

FIG. 2 is a block diagram of a communication system 10 according to at least one example embodiment of the inventive concepts.

Referring to FIG. 2, the communication system 10 may include a modem 100, an external memory 11 provided outside the modem 100, and at least one peripheral device 12, but the example embodiments are not limited thereto. The modem 100 may include a HARQ combiner 110, a HARQ controller 120, and an internal memory 130 for saving at least a part of multiple pieces of HARQ data to be saved for (e.g., associated with) a HARQ function.

According to the afore-described example embodiment, the HARQ controller 120 may control HARQ data save and fetch operations based on a CRC check result CRC_CW of data of a codeword unit, and timeout information Info_TO. In addition, the HARQ controller 120 may control the HARQ data save and fetch operations further based on information about a communication network structure. For example, the HARQ controller 120 may control the HARQ data save and fetch operations based on information about the number of component carriers (e.g., the component carrier information Info_CC).

According to at least one example embodiment, the modem 100 may receive data via a number of component carriers (CCs) less than a desired reference value and, in this case, the HARQ controller 120 may save HARQ data in the internal memory 130 based on the component carrier information Info_CC. Additionally, the modem 100 may receive data via a number of component carriers (CCs) equal to or greater than the reference value and, in this case, the HARQ controller 120 may save HARQ data in the external memory 11 based on the component carrier information Info_CC. In other words, the HARQ controller 120 may write HARQ data in the internal memory 130 or the external memory 11 based on results of an analysis of the component carrier information Info_CC.

According to the above example embodiment, power consumption may be reduced and HARQ data access performance may be improved by including an internal memory 130 having a relatively small size in the modem 100, and using the internal memory 130 in a case when the amount of HARQ data to be saved for a HARQ process is small. In addition, the internal memory 130 of the modem 100 may be reduced by using the external memory 11 in a case when the amount of HARQ data to be saved for a HARQ process is large.

Although HARQ data is saved based on various conditions such as a CRC check result, a timeout, and the number of component carriers in the afore-described example embodiments, the example embodiments of the inventive concepts may be variously modified. For example, channel status information (not shown) indicating characteristics and/or performance of a channel used for communication with a transmission system may be generated in the modem 100, and the decision to save the HARQ data inside or outside the modem 100 may be determined based on the channel status information.

A description is now given of an example of operation of a modem according to at least one example embodiment of the inventive concepts. A HARQ combining operation includes an operation of combining previously transmitted data with retransmitted data and, in this case, the previously transmitted and saved data is referred to as HARQ data. To describe various example embodiments of the inventive concepts, initial transmission and retransmission are used for convenience of explanation. However, the example embodiments of the inventive concepts may be equally or similarly applied to other transmission situations as well, such as previous retransmission and subsequent retransmission situations, etc.

Figure 3:
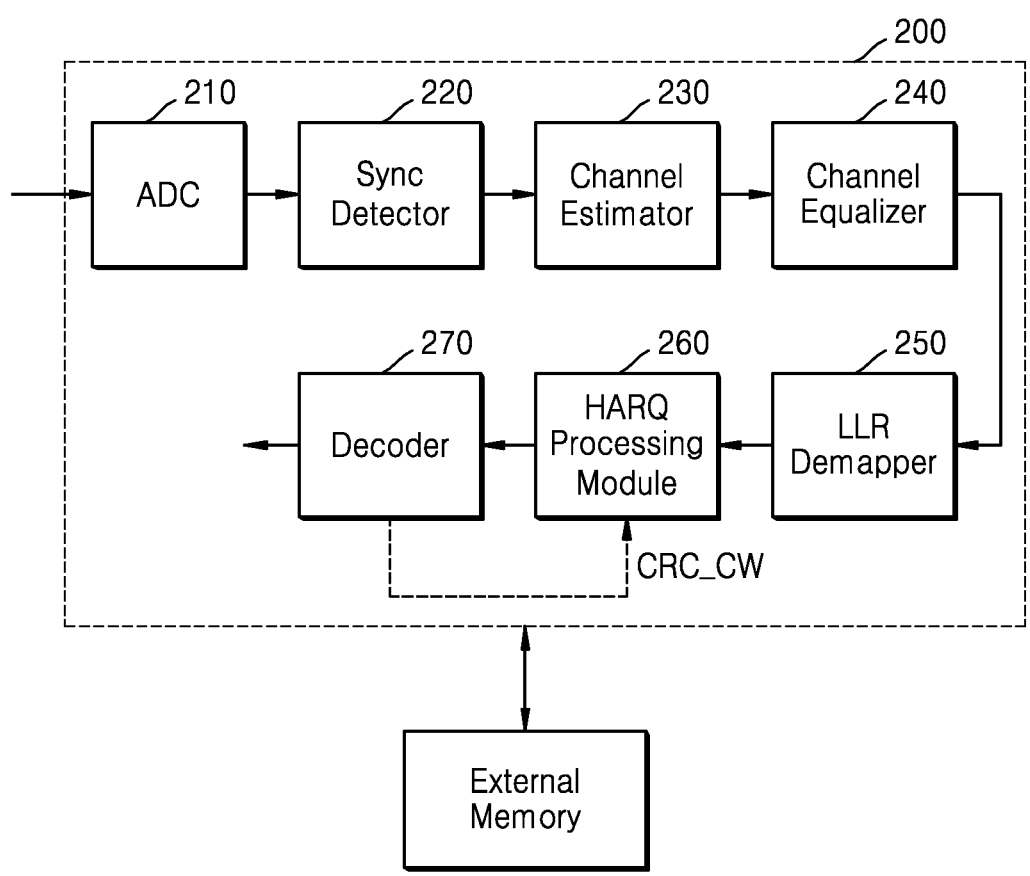
FIG. 3 is a block diagram of a modem chip according to at least one example embodiment of the inventive concepts.

FIG. 3 is a block diagram of a modem chip according to at least one example embodiment of the inventive concepts.

Referring to FIG. 3, a modem 200 may include an analog-to-digital converter (ADC) 210, a synchronization detector 220, a channel estimator 230, a channel equalizer 240, a log-likelihood ratio (LLR) demapper 250, a HARQ processing module 260, and a decoder 270, but the example embodiments are not limited thereto.

The ADC 210 may receive data transmitted from a transmission system. For example, the data provided to the ADC 210 may be an analog signal converted into a baseband signal by an RF chip, and the ADC 210 may convert the analog signal into a digital signal. The synchronization detector 220 may detect a synchronization signal for synchronizing the received signal, and the channel estimator 230 may generate a channel estimation signal by estimating the attenuation and/or distortion of a signal amplitude and/or distortion of a phase on a channel. The channel equalizer 240 may generate channel-compensated data by compensating the channel by using the channel estimation signal of the channel estimator 230. The LLR demapper 250 may receive the data from the channel equalizer 240 and remap the received data into an LLR soft bit signal (hereinafter referred to as an LLR signal). As such, HARQ data may be saved in the form of the LLR signal.

The HARQ processing module 260 may determine whether the received data is an initially transmitted signal (e.g., a newly transmitted signal) and/or a retransmitted signal, and perform a HARQ process based on the determination result. For example, the HARQ processing module 260 may determine whether to perform retransmission, based on, for example, acknowledgement (ACK) information or negative acknowledgement (NAK) information transmitted to the transmission system in a previous data process. When the received data is a retransmitted signal, the HARQ processing module 260 may generate combined data by performing a HARQ combining operation.

The data and/or the combined data of the HARQ processing module 260 may be provided to the decoder 270. The decoder 270 may perform a CRC check operation on each codeblock unit and each codeword unit of the received data, and provide the CRC check result to the HARQ processing module 260. According to at least one example embodiment, the decoder 270 may provide a CRC check result CRC_CW of the codeword unit to the HARQ processing module 260. Additionally, the decoder 270 may transmit the CRC check result CRC_CW of the codeword unit and a CRC check result of the codeblock unit to the HARQ processing module 260.

The modem 200 may save and/or selectively save HARQ data corresponding to a codeword unit having a CRC check error based on the CRC check result CRC_CW of the codeword unit, in an external memory. For example, in a 4G system, e.g., an LTE system, an error rate of initial transmission is adjusted to a level of 10 to 15% in consideration of the operation efficiency of HARQ, and the combined decoding is performed using combined data of a retransmission process, thereby greatly reducing the error rate. That is, according to at least one example embodiment of the inventive concepts, the number of accesses to the external memory may be reduced by selectively saving the HARQ data based on the CRC check result CRC_CW of the codeword unit.

Figure 4:
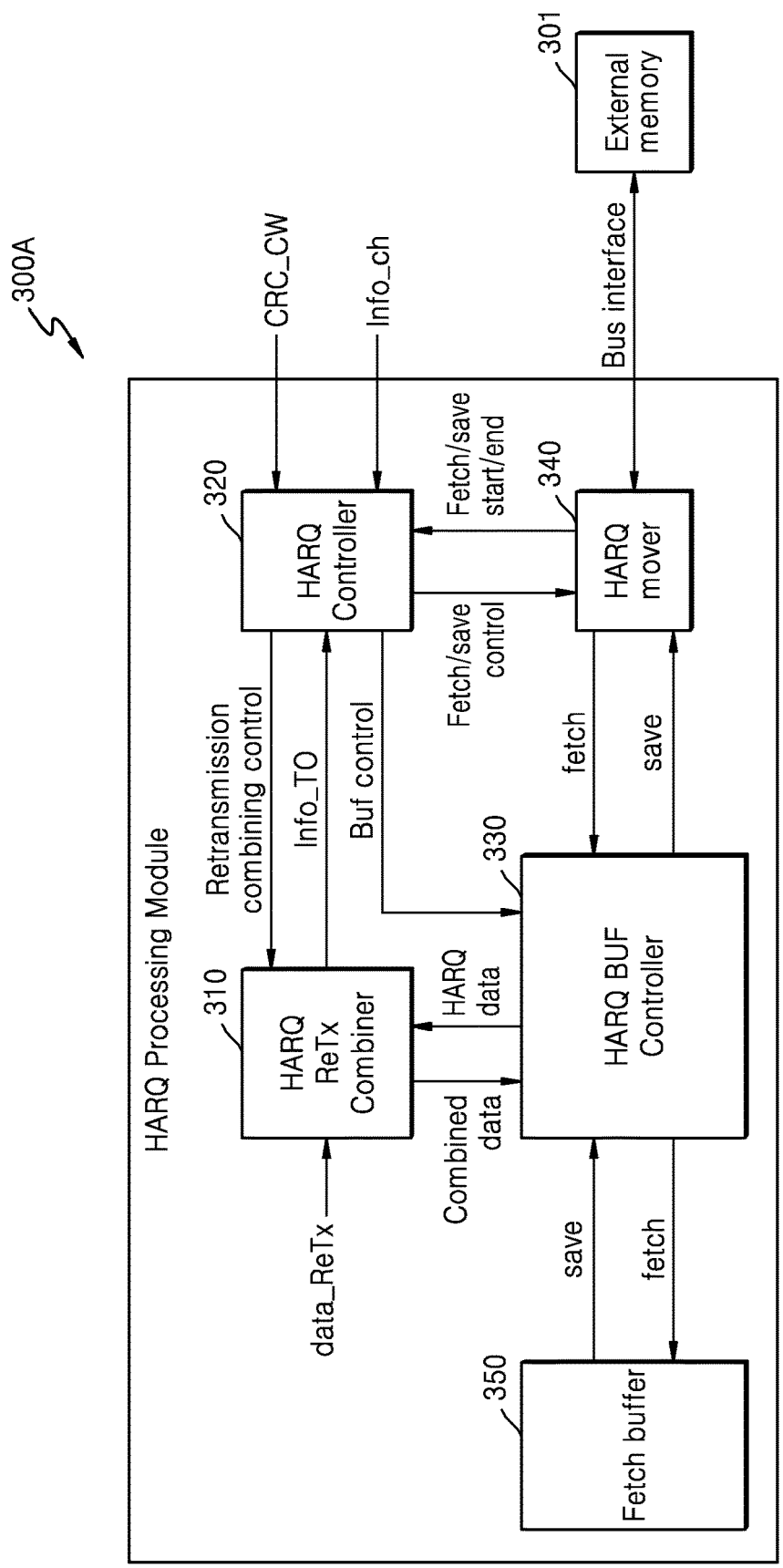
FIGS. 4 and 5 are block diagrams of HARQ processing modules included in a modem, according to at least one example embodiment of the inventive concepts.
Figure 5:
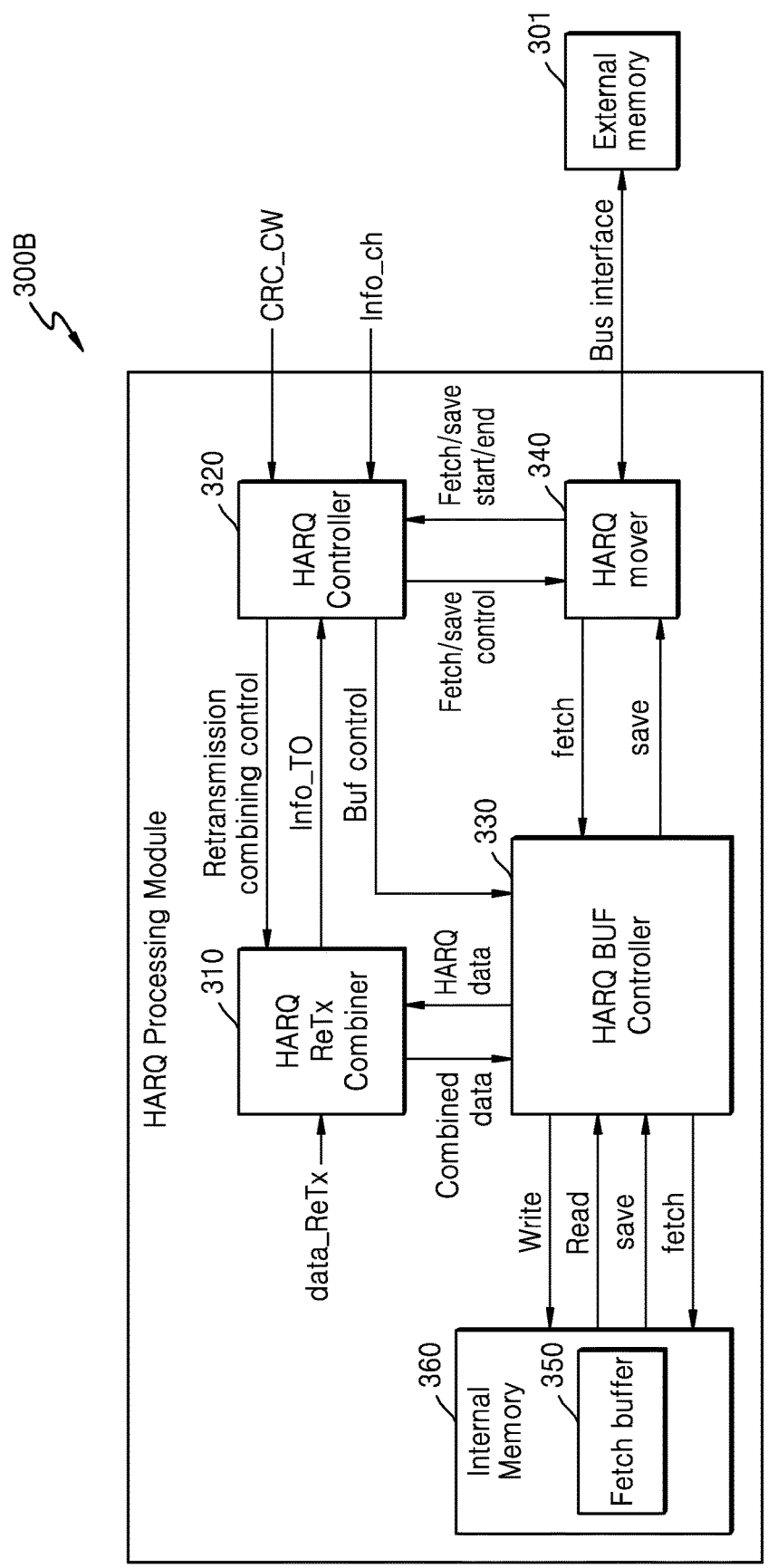

FIGS. 4 and 5 are block diagrams of HARQ processing modules 300A and 300B included in a modem, according to some example embodiments of the inventive concepts. FIG. 4 shows an example in which all HARQ data is saved in an external memory, and FIG. 5 shows an example in which HARQ data is separately allocated to and saved in an external memory and an internal memory.

Referring to FIG. 4, the HARQ processing module 300A may include a HARQ combiner 310, a HARQ controller 320, a HARQ buffer controller 330, a HARQ mover 340, and a fetch buffer 350, but the example embodiments are not limited thereto. Various elements of the HARQ processing module 300A illustrated in FIG. 4 may be configured as hardware for performing functions thereof in a hardware manner, or software executed by a CPU (and/or other processing device) included in the modem or the HARQ processing module 300A. Additionally, various elements of the HARQ processing module 300A, or the HARQ processing module 300A itself, may be configured as a combination of hardware and software. Although various types of information are transmitted among the elements of the HARQ processing module 300A in FIG. 4, at least a part of the various types of information may be generated when the CPU executes the software, and provided to the elements.

The HARQ combiner 310 may output combined data by combining retransmitted data data_ReTx with HARQ data. The HARQ combiner 310 may receive the HARQ data via the HARQ buffer controller 330 and provide the combined data, obtained by combining the retransmitted data data_ReTx with the HARQ data, to the HARQ buffer controller 330.

The HARQ controller 320 may control overall operations of the other elements of the HARQ processing module 300A. The HARQ controller 320 may control an operation of saving and/or fetching the HARQ data in and/or from an external memory 301. According to at least one example embodiment, the HARQ controller 320 may receive a CRC check result CRC_CW and control the HARQ data save operation based on the CRC check result CRC_CW. Additionally, the HARQ controller 320 may receive timeout information Info_TO and control the HARQ data save and fetch operations based on the timeout information Info_TO. Although the example embodiment of FIG. 4 shows an example in which the HARQ controller 320 receives the timeout information Info_TO from the HARQ combiner 310, the example embodiments of the inventive concepts are not limited thereto and the timeout information Info_TO may be provided from other sources, such as the HARQ buffer controller 330 and/or the HARQ mover 340, etc.

The HARQ mover 340 may save and/or fetch the HARQ data in and/or from the external memory 301 by interfacing with a bus shared with other peripheral devices. In addition, the HARQ mover 340 may provide information indicating the start and/or end of the HARQ data fetch and/or save operation to the HARQ controller 320.

The HARQ buffer controller 330 may control transmission of the HARQ data between the fetch buffer 350 and the external memory 301. The fetch buffer 350 may be used to save (e.g., temporarily save) the HARQ data fetched from the external memory 301, until the HARQ combining operation ends. For example, the HARQ buffer controller 330 may provide the HARQ data fetched from the external memory 301 to the fetch buffer 350. In addition, the HARQ data may be moved from the fetch buffer 350 to the external memory 301 based on a CRC check result under the control of the HARQ buffer controller 330. According to at least one example embodiment, the combined data may be provided to the external memory 301 directly and/or after being saved (e.g., temporarily saved) in the fetch buffer 350.

The HARQ controller 320 may control the HARQ combining operation of the HARQ combiner 310 based on the timeout information Info_TO. For example, when the HARQ data is not normally fetched from the external memory 301, the HARQ controller 320 may control the HARQ combiner 310 to process the retransmitted data as initially transmitted data. When the combined data of the HARQ combiner 310 is not normally saved in the external memory 301, the HARQ controller 320 may control the HARQ combiner 310 to process the retransmitted data as initially transmitted data.

According to at least one example embodiment, the HARQ controller 320 may control the HARQ data save operation further based on channel information Info_ch to increase bus efficiency. For example, if current data is received on a channel having an undesired status, e.g., a very bad status, a rapidly deteriorating status, etc., even when a CRC check failure occurs in the data, HARQ data corresponding to the data may be controlled not to be saved. That is, if a channel has a characteristic value equal to or less than a certain desired reference value, even when HARQ data based on data received on the channel is saved and used for a subsequent HARQ process, restrictions may occur in the HARQ performance. Considering this, the channel information Info_ch may be compared to a certain desired reference value, and the HARQ data save operation may be controlled based on the comparison result.

Although not shown in FIG. 4, the HARQ data saved in the external memory 301 and/or the fetch buffer 350 may be compressed before being saved according to at least one example embodiment. For example, the HARQ data provided from the HARQ buffer controller 330 is compressed data and may be decompressed before being provided to the HARQ combiner 310. The HARQ data provided from the HARQ combiner 310 is non-compressed data and may be compressed before being saved in the external memory 301 and/or the fetch buffer 350.

Although the HARQ mover 340 directly accesses the external memory 301 by using a shared bus in FIG. 4, the example embodiments of the inventive concepts are not limited thereto. For example, a memory controller (not shown) for generating various commands and addresses may be included in the modem (or a modem chip) to interface with the external memory 301, such as DRAM, and the HARQ mover 340 may access the external memory 301 via the memory controller. Additionally, when the modem including the HARQ processing module 300A of FIG. 4 is integrated into an application processor, a memory interface (not shown) for interfacing with the external memory 301 may be separately included in the application processor, and the HARQ mover 340 may access the external memory 301 via the memory interface.

FIG. 5 shows an additional example embodiment of the HARQ processing module 300A illustrated in FIG. 4. As illustrated in FIG. 5, the HARQ processing module 300B may further include an internal memory 360 for saving HARQ data. In the example embodiment of FIG. 4, the fetch buffer 350 may be provided separately from the internal memory 360 or a partial area of the internal memory 360 may be used as the fetch buffer 350. FIG. 5 shows at least one example embodiment in which the fetch buffer 350 corresponds to a partial area of the internal memory 360, and the HARQ data fetched from the external memory 301 may be saved (and/or temporarily saved) in the fetch buffer 350.

HARQ data used for a HARQ process may be separately allocated to and saved in the internal memory 360 and the external memory 301. For example, a part of multiple pieces of HARQ data used for a HARQ process may be written in the internal memory 360, and the HARQ data read from the internal memory 360 may be provided to the HARQ combiner 310. Additionally, data combined by the HARQ combiner 310 may also be written in and/or read from the internal memory 360.

Figure 6:
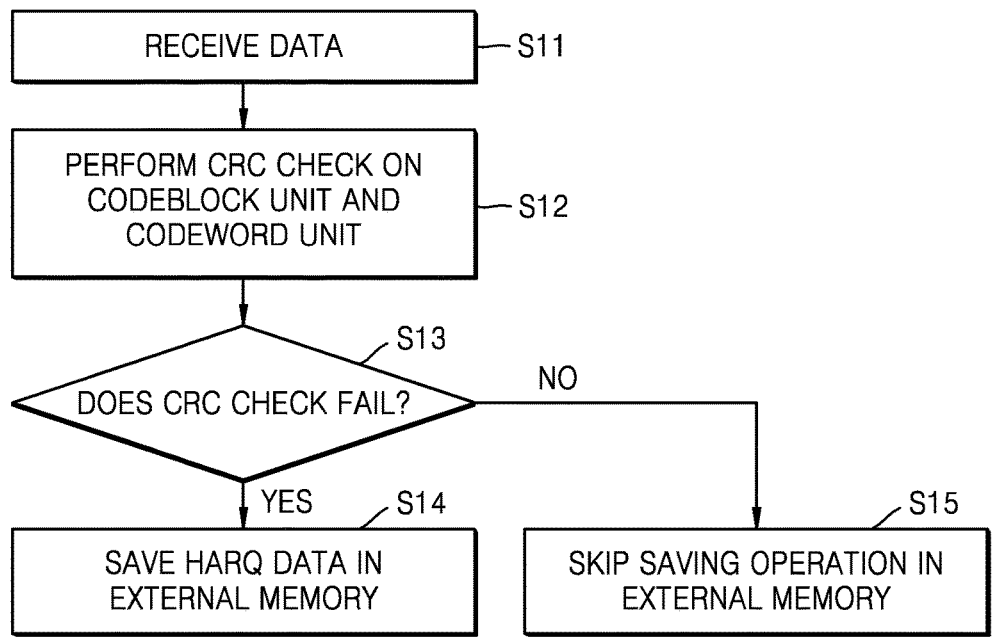
FIGS. 6 and 7 are flowcharts of operating methods of a modem, according to at least one example embodiment of the inventive concepts.
Figure 7:
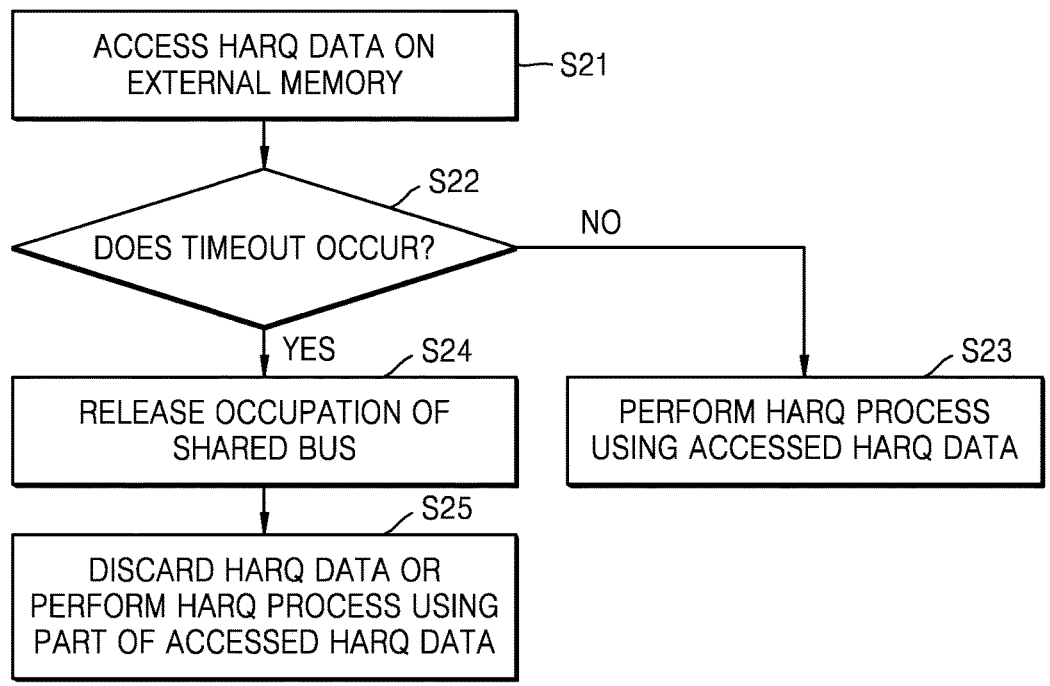

FIGS. 6 and 7 are flowcharts of operating methods of a modem, according to some example embodiments of the inventive concepts.

Referring to FIG. 6, data of a plurality of codeword units may be received from a transmission system (S11), and each codeword unit may include a plurality of codeblock units. A CRC check operation, or other error correction operation, may be performed on the received data by using a CRC code of each codeblock unit and a CRC code of each codeword unit (S12).

An operation of saving HARQ data in an external memory may be controlled based on the CRC check result. For example, it may be determined whether the CRC check result indicates failure (S13), and, if the CRC check result indicates failure, the HARQ data may be saved in the external memory (S14). On the contrary, if the CRC check result indicates success, the operation of saving the HARQ data in the external memory may be skipped (S15). As in the afore-described example embodiments, the CRC check result may include a CRC check result of the codeblock unit and a CRC check result of the codeword unit, and it may be determined whether the CRC check result of at least one of the codeblock unit and the codeword unit indicates failure. According to other example embodiments, the HARQ data save operation may be controlled based on only the CRC check result of the codeword unit, but is not limited thereto.

Referring to FIG. 7, an operation of accessing HARQ data saved in an external memory may be performed (S21). The access operation may be an operation of saving and/or fetching the HARQ data in and/or from the external memory. It may be determined whether a timeout occurs in the access operation (S22).

Upon determining that the timeout does not occur, a HARQ process may be performed using the HARQ data normally accessed in and/or from the external memory (S23). If it is determined that the timeout occurs, the occupation of a shared bus connected to the external memory may be released (S24). The not-normally accessed HARQ data may be discarded without being used for a subsequent HARQ process, or the HARQ process may be performed using a normally accessed part of the HARQ data (e.g., the HARQ data of a codeblock unit) (S25).

A description is now given of examples of HARQ processes according to some example embodiments of the inventive concepts.

Figure 8A:
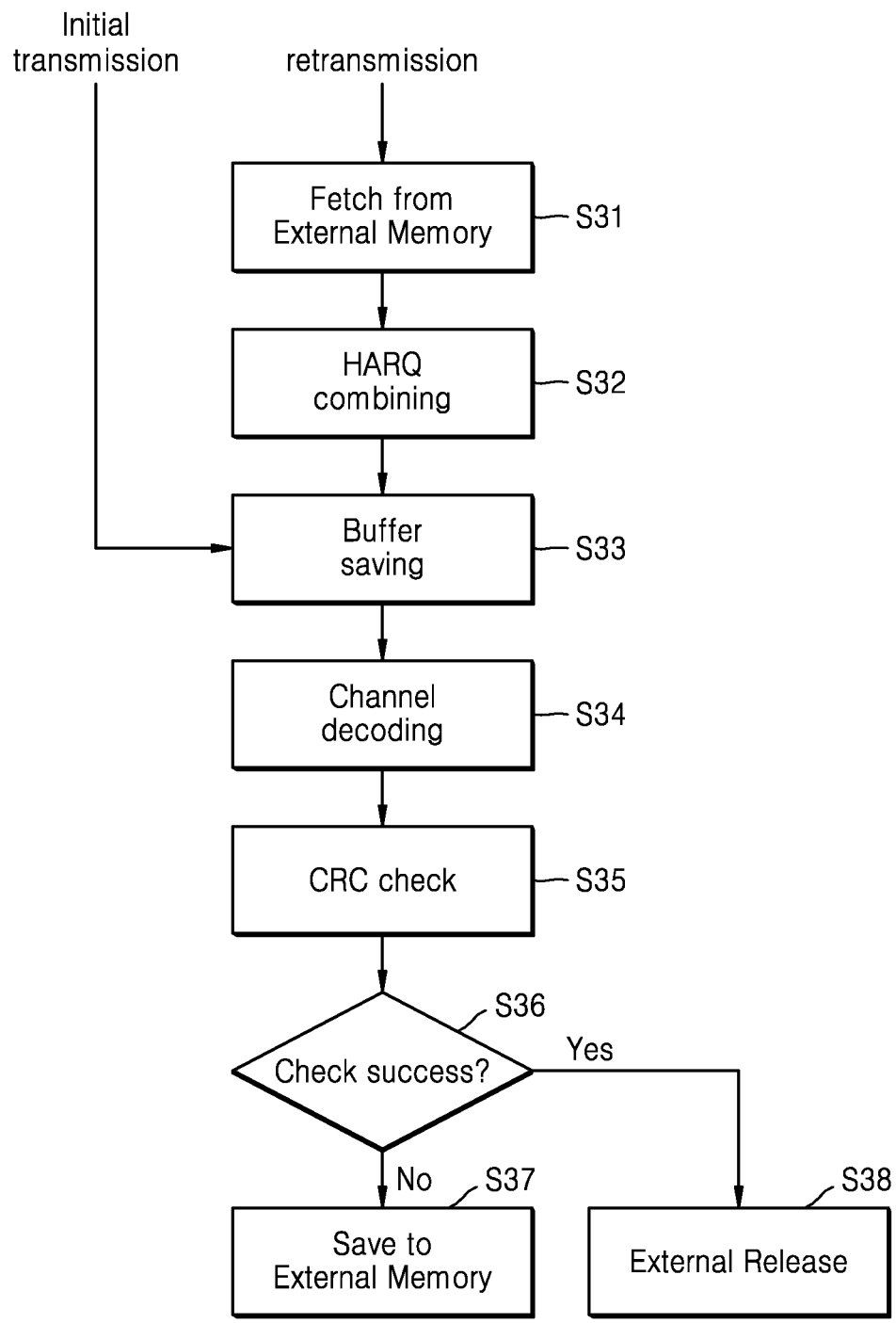
FIGS. 8A and 8B are diagrams showing an example of a HARQ data save operation using a CRC check result of a codeword unit, according to at least one example embodiment of the inventive concepts.
Figure 8B:
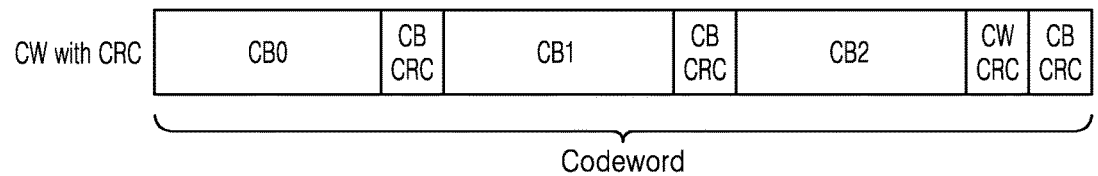

FIGS. 8A and 8B are diagrams showing an example of a HARQ data save operation using a CRC check result of a codeword unit, according to some example embodiments of the inventive concepts.

Referring to FIG. 8A, if data transmitted from a transmission system is initially transmitted data, the data may be saved (e.g., temporarily saved) in a buffer of a modem (S33). The buffer of the modem is a buffer for saving and/or temporarily saving the currently transmitted data and HARQ data during a channel decoding operation and/or a HARQ combining operation, and may correspond to a fetch buffer and/or a partial area of an internal memory according to various example embodiments. Otherwise, if the data transmitted from the transmission system is retransmitted data, the HARQ data saved in an external memory is fetched for a HARQ combining operation (S31), the fetched data is saved (e.g., temporarily saved) in the buffer of the modem, and the retransmitted data and the HARQ data are combined (S32). The combined data may be saved in the buffer (S33).

A channel decoding operation is performed on the initially transmitted data and/or the combined data (S34), and the channel decoding operation may include a CRC check operation on each codeblock unit and a CRC check operation on each codeword unit (S35). Referring to FIG. 8B, one codeword includes a plurality of codeblocks (e.g., CB0 to CB2), and CRC codes CB CRC corresponding to the codeblocks CB0 to CB2 and a CRC code CW CRC corresponding to the codeword may be included in the data transmitted from the transmission system. It is determined whether the CRC check result indicates success (S36).

The HARQ data of the codeword unit may be selectively saved in the external memory based on the CRC check result. For example, when the data on which the CRC operation is performed is retransmitted data and previously transmitted HARQ data is saved in the external memory, upon determining that the CRC check result indicates success, saving of the HARQ data saved in the external memory may be released (S38). On the contrary, upon determining that the CRC check result indicates failure, the HARQ data corresponding to the initially transmitted data or the combined data may be saved in the external memory (S37).

According to the above embodiment, since the CRC codes CB CRC for the codeblock units and the CRC code CW CRC for the codeword unit are used together, a possibility of saving HARQ data, the CRC check result of which is inaccurately determined, may be reduced. That is, when only the CRC codes CB CRC for the codeblock units are used, although received data corresponds to failure, the CRC check result can be inaccurately determined to success. However, according to at least one example embodiment of the inventive concepts, the HARQ data may be saved in the external memory based on an accurately determined CRC check result.

Figure 9:
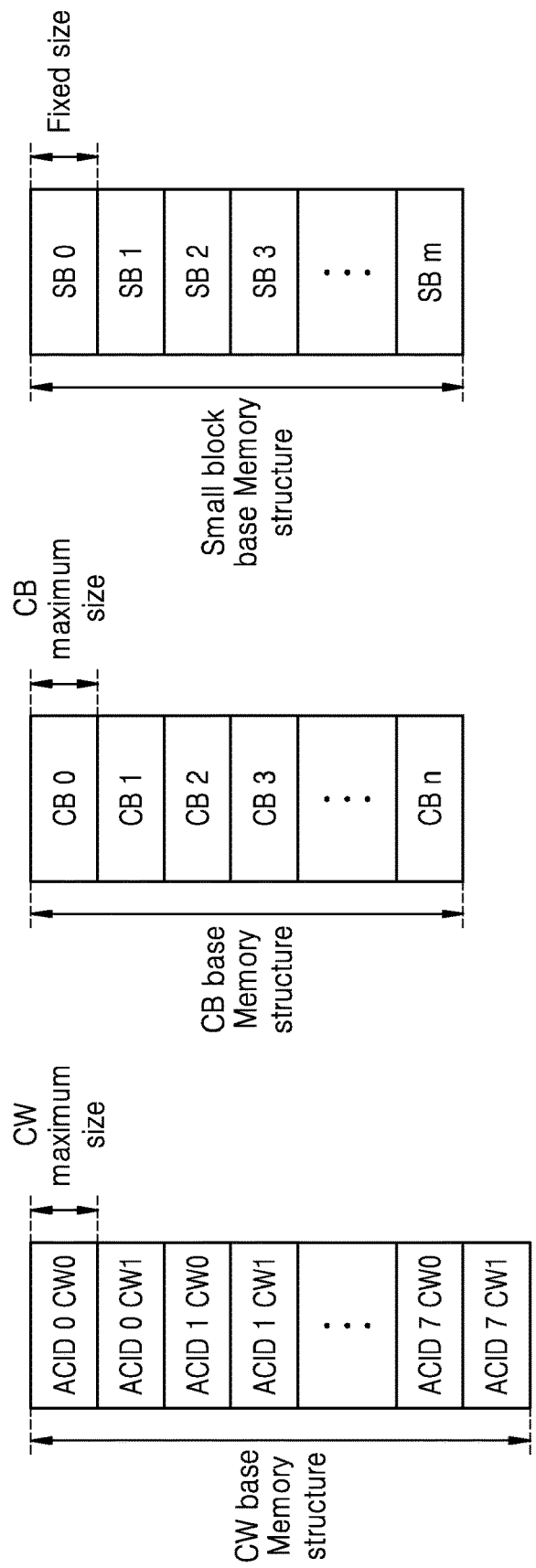
FIG. 9 is a diagram showing an example of an operation of saving HARQ data of a codeword unit in an external memory, according to at least one example embodiment of the inventive concepts.

FIG. 9 is a diagram showing an example of an operation of saving HARQ data of a codeword unit in an external memory, according to at least one example embodiment of the inventive concepts.

Referring to FIG. 9, one codeword CW may include a plurality of codeblocks CB, and each codeblock may include a plurality of small blocks SB having a certain size (e.g., a desired small block size or small block length). A plurality of HARQ channels between a transmission system and a reception system are defined based on mobile communication standards, and FIG. 9 shows an example in which first to eighth channels ACID0 to ACID7 are defined, but the example embodiments are not limited thereto. The transmission system may transmit data on each of the first to eighth channels ACID0 to ACID7, and the reception system may transmit a response signal ACK or NAK for requesting to retransmit the data corresponding to each of the first to eighth channels ACID0 to ACID7 to the transmission system.

According to at least one example embodiment, an external memory for saving HARQ data may include save spaces allocated to the plurality of HARQ channels, such as first to eighth channels ACID0 to ACID7. For example, HARQ data corresponding to codewords CW0 and CW1 received on the first channel ACID0 may be saved in a region of the external memory and, similarly, spaces for saving HARQ data corresponding to the second to eighth channels ACID1 to ACID7 may be allocated in the external memory.

When HARQ data is saved in the external memory in codeblock units and/or in small block units, codeblocks CB0 to CBn and/or small blocks SB0 to SBm included in a plurality of codewords may be saved in the external memory.

According to at least one example embodiment of the inventive concepts, when the external memory is configured in units corresponding to a desired size, such as the maximum size of a codeword, a memory fragmentation problem may not be generated and/or reduced, and thus the external memory may be efficiently used. In addition, since a CRC check result of the codeword unit is usable, data reliability may be increased and the number of data accesses to a bus may be reduced. When small block units are applied, the number of accesses to a bus may be greatly increased. In addition, since CRC information is not usable on the individual small block units, data reliability may be reduced and memory fragmentation may be generated severely and/or increased. When codeblock units are applied, a plurality of codeblock units make up a single codeword unit dependent on the mobile communication specification. For example, one codeword may include 32 codeblocks based on a mobile communication specification. In this case, the number of accesses to a bus or memory fragmentation may be increased and a CRC check result may be inaccurately determined and/or unreliable as to the entire codeword based off of a single codeblock unit.

A description is now given of HARQ control operations based on a timeout, according to some example embodiments of the inventive concepts.

Figure 10A:
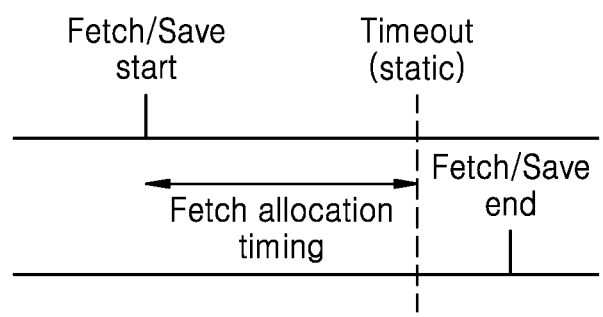
FIGS. 10A and 10B are diagrams showing examples of determining a timeout according to at least one example embodiment of the inventive concepts.
Figure 10B:
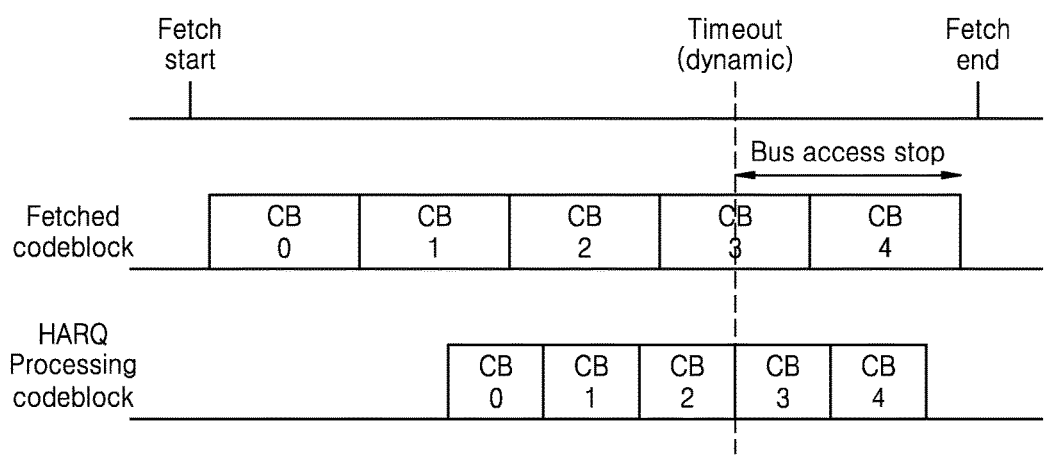

FIGS. 10A and 10B are diagrams showing examples of determining a timeout according to some example embodiments. FIG. 10A shows an example of determining a static timeout, and FIG. 10B shows an example of determining a dynamic timeout.

When a HARQ mover accesses an external memory via a shared bus, a bus delay (e.g., a delay related due to the bus access) may be generated. The concept of a timeout may be employed to decrease and/or prevent degradation in HARQ performance and/or degradation in peripheral device performance due to the bus delay time. For example, because HARQ data save and fetch operations may be delayed due to the bus delay, a timeout may be determined to ensure the normal performance of HARQ combining, and a HARQ process may be controlled based on the timeout determination result.

Referring to FIG. 10A, a HARQ data fetch/save operation may start (Fetch/Save start), and a HARQ combining operation may start after the fetch/save operation ends (Fetch/Save end). To reduce and/or prevent a fetch/save operation end timing from being delayed a great amount due to a bus delay, a fetch allocation timing corresponding to a certain time after the fetch/save operation starts may be set, and it may be determined that a timeout occurs, if the fetch/save operation does not end until the fetch allocation timing. In other words, if the fetch/save operation does not end before the end of the desired fetch allocation timing period a timeout may occur.

The fetch allocation timing for determining the timeout may be set using various schemes. For example, when the amount of data received in one transmit time interval (TTI) (e.g., 1 ms) unit defined by mobile communication standards, e.g., LTE standards, varies, the amount of HARQ data fetched from the external memory may vary. The amount of data transmitted and/or received in one TTI time unit may be detected and the fetch allocation timing may be set based on the detected amount of data. For example, the amount of data of the TTI unit may be analyzed using a combination of software and hardware components by using information included in a packet transmitted from a transmission system.

Referring to FIG. 10B, a timeout may be dynamically determined according to at least one example embodiment. For example, the dynamic timeout determination may be performed only in an operation of fetching HARQ data from the external memory, but the example embodiments are not limited thereto and the dynamic timeout determination may be determined in other situations as well. For example, an operation of fetching HARQ data of a codeword unit from the external memory may start (Fetch start), and the fetched HARQ data may be saved in a fetch buffer of a modem. In this case, a timeout may be determined by determining whether HARQ data of a codeblock to be used for a current HARQ combining operation among a plurality of codeblocks included in one codeword is completely saved in the fetch buffer.

For example, in FIG. 10B, when the fetch operation starts, codeblocks CB0 to CB4 included in one codeword may be sequentially saved in the fetch buffer, and a HARQ combining operation may be performed from the first codeblock CB0 after a certain (e.g., desired) time. At a time when the HARQ combining operation on the third codeblock CB2 starts, HARQ data of the third codeblock CB2 may be normally and completely saved in the fetch buffer. However, at a time when the HARQ combining operation on the fourth codeblock CB3 starts. HARQ data of the fourth codeblock CB3 may not be completely fetched. In this case, a dynamic timeout may be determined at the time when the HARQ combining operation on the fourth codeblock CB3 starts, and thus the operation of fetching the HARQ data from the external memory may be stopped in order to ensure that the desired codeblock (e.g., CB3) is properly saved in the fetch buffer prior to the beginning of the HARQ processing of the desired codeblock.

A description is now given of various examples of HARQ processes in a case when a timeout occurs in HARQ data fetch and save operations.

Figure 11:
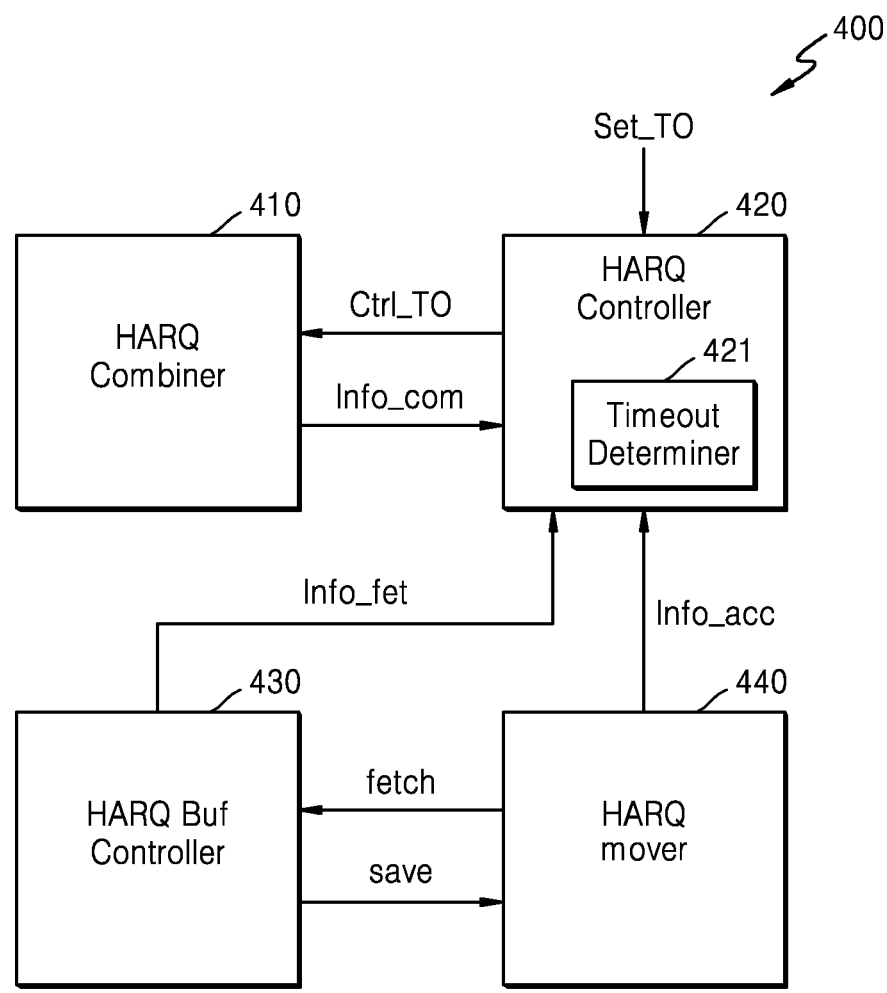
FIG. 11 is a block diagram of an example of a HARQ processing module for performing a HARQ process based on determination of a timeout according to at least one example embodiment of the inventive concepts.

FIG. 11 is a block diagram of an example of a HARQ processing module 400 for performing a HARQ process based on determination of a timeout according to at least one example embodiment.

Referring to FIG. 11, the HARQ processing module 400 may include a HARQ combiner 410, a HARQ controller 420, a HARQ buffer controller 430, and a HARQ mover 440, but is not limited thereto. Although not shown in FIG. 11, as in the afore-described example embodiments, an external memory for saving HARQ data may be provided outside a modem including the HARQ processing module 400, and a fetch buffer for saving (e.g., temporarily saving) fetched HARQ data may be included in the modem.

The HARQ controller 420 may include a timeout determiner 421. The timeout determiner 421 may determine a static timeout and/or a dynamic timeout according to at least one example embodiment. In addition, the timeout determiner 421 may provide a timeout control signal Ctrl_TO for controlling a HARQ process based on the timeout determination result, to the HARQ combiner 410. The timeout determiner 421 may determine a timeout based on information from received various elements included in the modem and/or the HARQ processing module 400.

For instance, to determine a static timeout, the timeout determiner 421 may receive setting information Set_TO set to a certain time value (e.g., a desired time value), and determine a timeout (e.g., a timeout period) based on the setting information Set_TO. The Set_TO signal include setting information related to a desired timeout time period. For example, when the HARQ mover 440 starts an access operation, such as a HARQ data fetch or save operation, the HARQ mover 440 may transmit access information Info_acc indicating the start of the access operation to the HARQ controller 420. The timeout determiner 421 may determine that the timeout occurs if the access operation does not end during a time period corresponding to the setting information Set_TO after the access operation starts.

Additionally, the HARQ controller 420 may receive information Info_fet indicating a completely fetched codeblock from the HARQ buffer controller 430, and receive information Info_com indicating a codeblock to be used for a current HARQ combining operation from the HARQ combiner 410. The timeout determiner 421 may determine whether HARQ data corresponding to the codeblock to be used for the current HARQ combining operation is completely fetched based on the information Info_fet and the information Info_com. Based on the determination result, if the HARQ data for the current HARQ combining operation is not completely fetched the timeout determiner 421 may determine that the timeout occurs and/or is desired and therefore (dynamically) generates a timeout signal Ctdl_TO and transmits the timeout signal Ctrl_TO to the HARQ Combiner 410.

The various types of information and control signals shown in FIG. 11 are merely examples and the above-described HARQ process may be performed using various other schemes according to other example embodiments.

Figure 12:
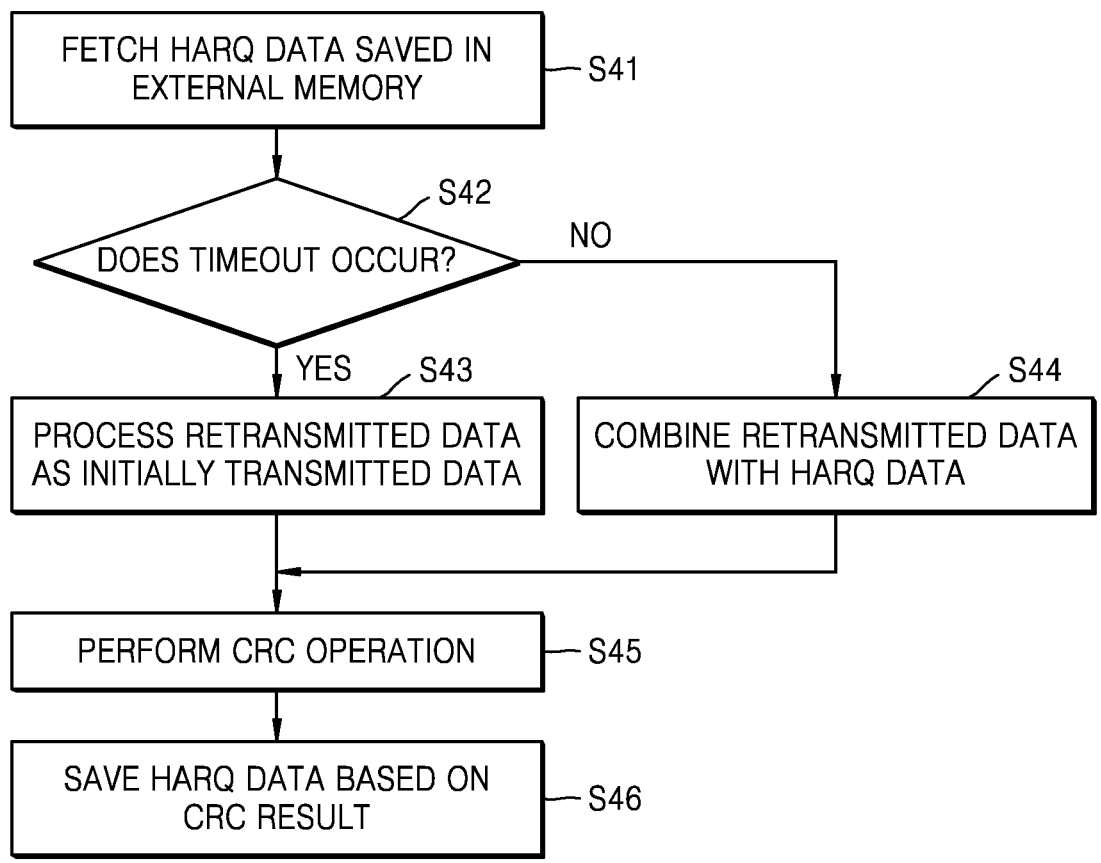
FIGS. 12 to 14 are flowcharts of various examples of HARQ processes in a case when a timeout occurs according to at least one example embodiment of the inventive concepts.
Figure 13:
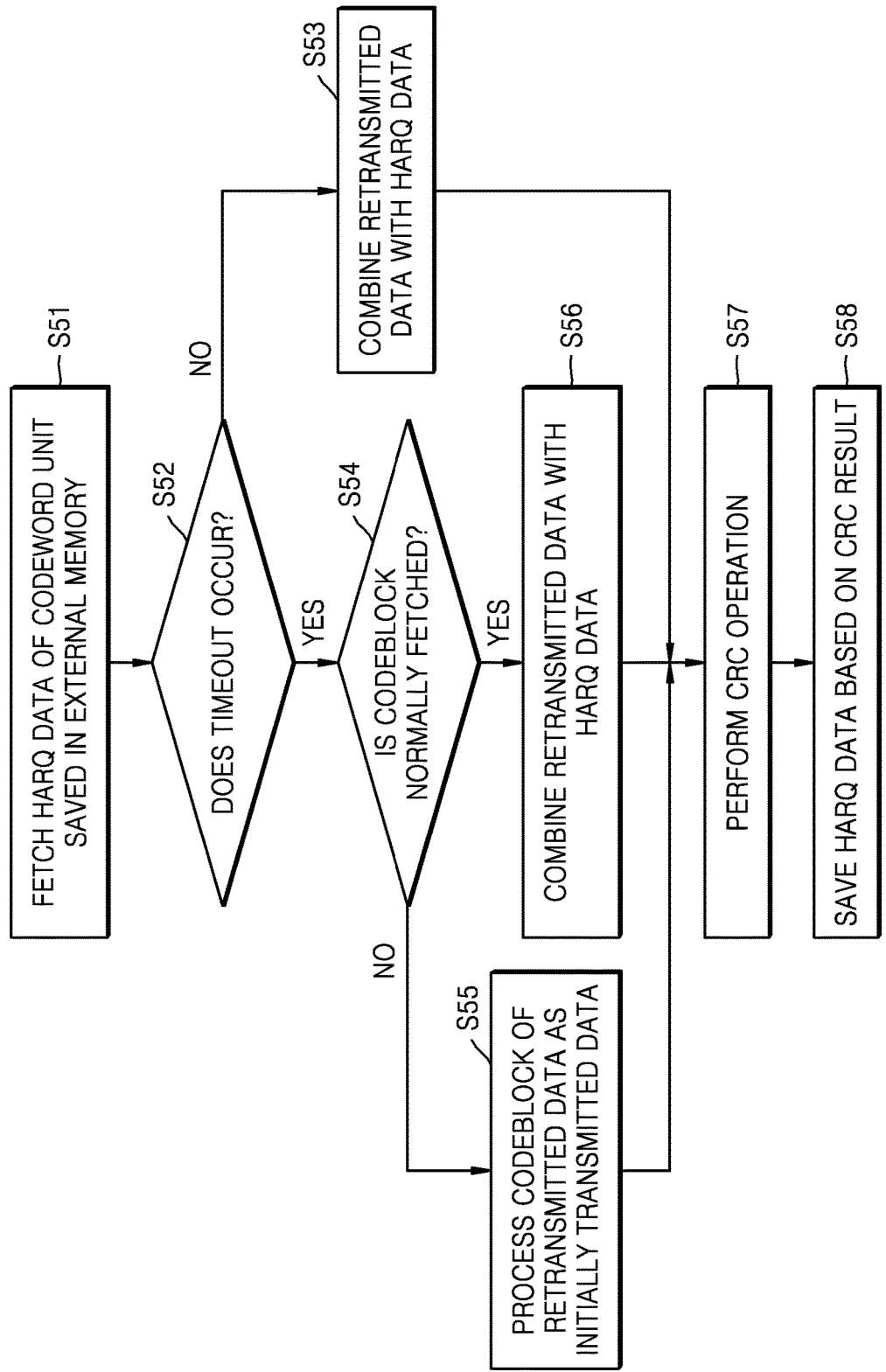
Figure 14:
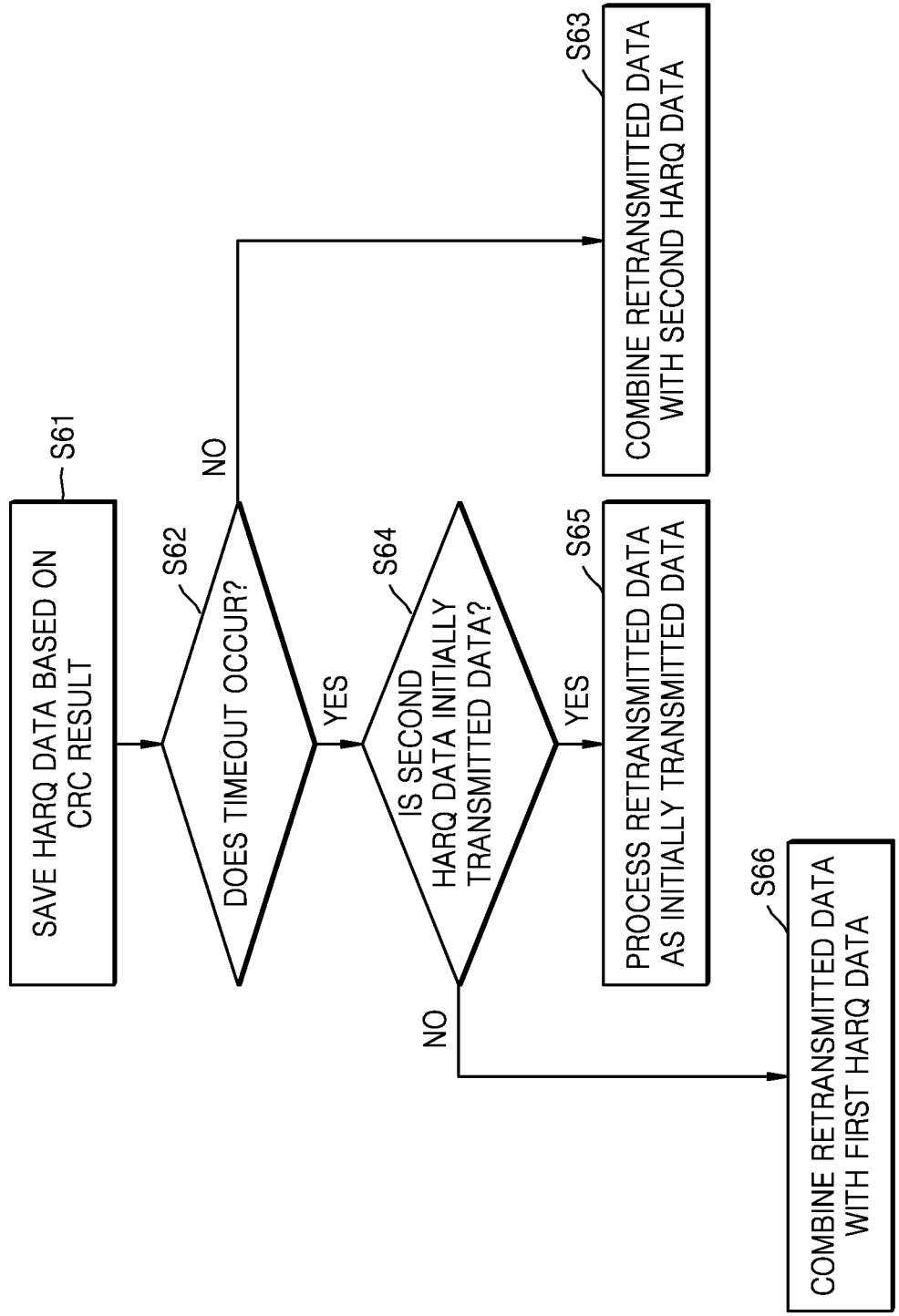

FIGS. 12 to 14 are flowcharts of various examples of HARQ processes in a case when a timeout occurs according to some example embodiments. In the example embodiments of FIGS. 12 to 14, a static or dynamic timeout determination operation according to the above example embodiments may be used.

FIG. 12 shows an example in which a timeout occurs when HARQ data is fetched from an external memory according to at least one example embodiment. Referring to FIG. 12, the HARQ data saved in the external memory is fetched (S41), and it is determined (either statically or dynamically) whether a timeout occurs in the fetch operation (S42).

Data retransmitted from a transmission system may be differently processed based on whether the timeout occurs. For example, when the timeout occurs in the HARQ data fetch operation, instead of not performing a HARQ combining operation by using the not-normally fetched HARQ data, the retransmitted data may be processed as initially transmitted data (S43). On the contrary, when the timeout does not occur in the HARQ data fetch operation, combined data may be generated by performing a HARQ combining operation by using the normally fetched HARQ data (S44).

Thereafter, a CRC operation may be performed on the data processed as the initially transmitted data, or the HARQ combined data (S45). For example, according to at least one example embodiment, a CRC check operation may be performed using CRC information of a codeword unit, but the example embodiments are not limited thereto. The HARQ data may be saved (and/or selectively saved) based on the CRC check result (S46). According to at least one example embodiment, the HARQ data corresponding to a codeword and the CRC check result of which indicates failure may be saved in the external memory.

FIG. 13 shows another example of a HARQ process in a case when a timeout occurs according to at least one example embodiment. Referring to FIG. 13, HARQ data of a codeword unit saved in an external memory is fetched (S51), and it is determined whether a timeout occurs in the fetch operation (S52). The HARQ data of the codeword unit may include HARQ data of a plurality of codeblock units, and it may be determined whether the timeout occurs when the HARQ data of the codeblock units are sequentially fetched.

For example, if the timeout does not occur during the HARQ data fetch operation, combined data may be generated by performing a HARQ combining operation by using the normally fetched HARQ data (S53). Otherwise, if the timeout occurs during the HARQ data fetch operation, it may be determined whether normally fetched HARQ data is present in each codeblock unit (S54).

Based on the determination result, if the HARQ data corresponding to data of a retransmitted codeblock unit is not normally fetched (e.g., an error has occurred during the fetching of the HARQ data), the data of the retransmitted codeblock unit may be processed as initially transmitted data (S55). Otherwise, if the HARQ data corresponding to the data of the retransmitted codeblock unit is normally fetched, combined data may be generated by combining the data of the retransmitted codeblock unit with the HARQ data (S56).

As described above, a HARQ combining operation may be performed (and/or selectively performed) on normally fetched codeblocks, and thus a CRC check operation may be performed on data obtained by performing HARQ combining on all codeblocks, or data obtained by performing HARQ combining on some codeblocks (S57). The HARQ data may be selectively saved in the external memory based on the CRC check result (S58).

FIG. 14 shows an example of a HARQ process in a case when a timeout occurs when combined data is saved in an external memory according to at least one example embodiment.

Referring to FIG. 14, a CRC check operation is performed on initially transmitted data or data combined using the above-described HARQ combining operation, and data which the CRC check result indicates failure, e.g., second HARQ data, is saved in the external memory (S61). It may be determined whether a timeout occurs during the second HARQ data save operation (S62).

Based on the determination result, if the timeout does not occur, a HARQ combining operation may be performed to combine subsequently retransmitted data with the second HARQ data saved in the external memory (S63). Otherwise, if the timeout occurs, it is determined whether the second HARQ data corresponds to initially transmitted data (S64).

If the second HARQ data corresponds to initially transmitted data, HARQ data that is normally saved to be combined with subsequently retransmitted data is not present in the external memory, and thus the subsequently retransmitted data may be processed as initially transmitted data (S65). Otherwise, if the second HARQ data does not correspond to initially transmitted data, the previously received first HARQ data may be saved in the external memory, and thus a HARQ combining operation may be performed to combine subsequently retransmitted data with the first HARQ data saved in the external memory (S66).

In some example embodiments, even when a timeout occurs, validly fetched and/or saved HARQ data of a codeblock unit is used for a HARQ process. However, the example embodiments of the inventive concepts may be variously modified. For example, validly fetched and/or saved HARQ data of a small block unit may be used for a HARQ combining operation, or HARQ data of one or more bit units smaller than the small block unit may be used, etc.

Figure 15:
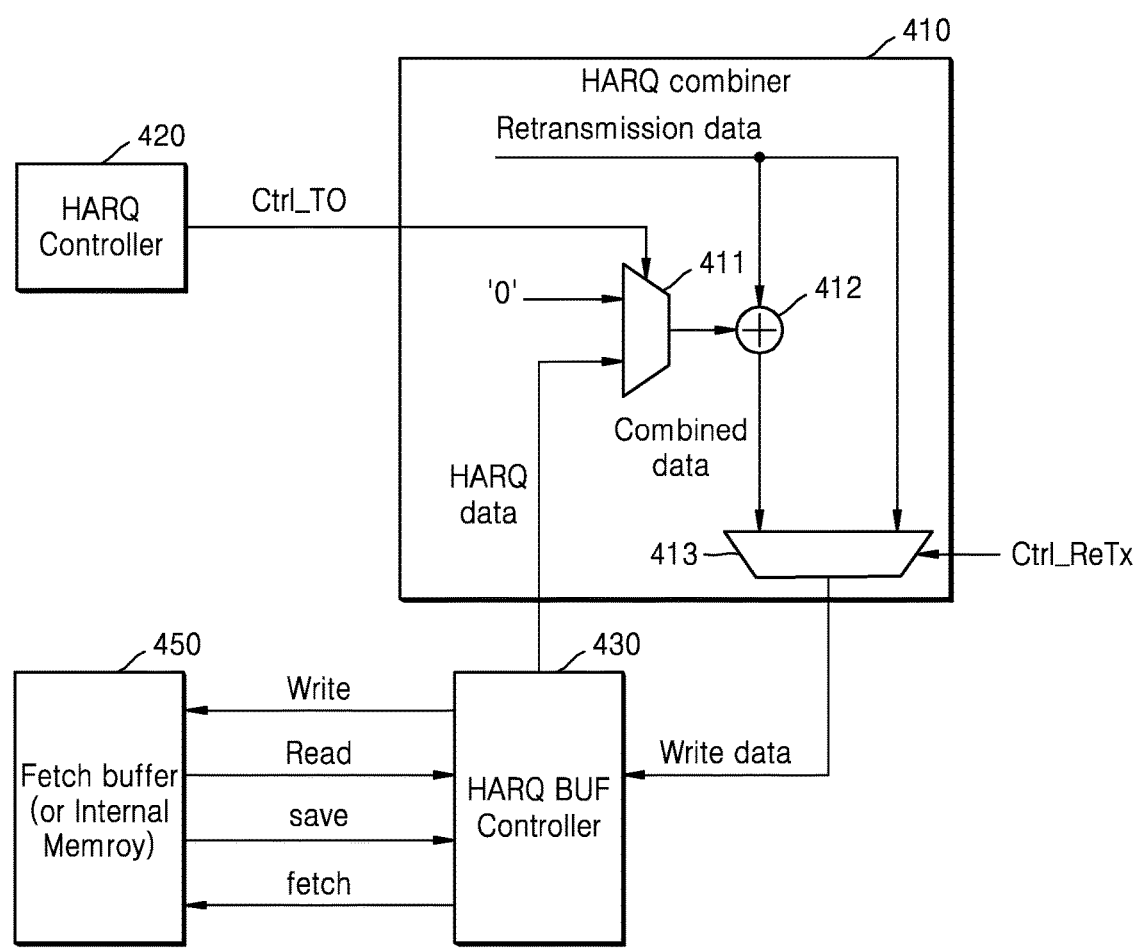
FIG. 15 is a block diagram of a HARQ processing module for describing an example of a HARQ process in a case when a timeout occurs according to at least one example embodiment of the inventive concepts.

FIG. 15 is a block diagram of a HARQ processing module 400 for describing an example of a HARQ process in a case when a timeout occurs according to at least one example embodiment.

Referring to FIGS. 11 and 15, the HARQ processing module 400 may include the HARQ combiner 410, the HARQ controller 420, the HARQ buffer controller 430, and a fetch buffer 450, etc. For convenience of explanation, the HARQ mover 440 is not illustrated in FIG. 15, but otherwise may be included in the HARQ processing module 400 in some example embodiments. The fetch buffer 450 may save (e.g., temporarily save) HARQ data saved in an external memory. According to at least one example embodiment, the fetch buffer 450 may be an internal memory for saving a part of HARQ data.

The HARQ combiner 410 may include a first selector 411, a combiner 412, and a second selector 413, but is not limited thereto. The HARQ controller 420 may determine a static timeout and/or a dynamic timeout according to at least one example embodiment, and provide a timeout control signal Ctrl_TO to the HARQ combiner 410 based on the determination result (e.g., the determined timeout period). The first selector 411 may receive a certain desired value (e.g., a bit value corresponding to logic low 0, etc.), receive HARQ data from the HARQ buffer controller 430, and selectively output any one input in response to the timeout control signal Ctrl_TO based on the timeout control signal Ctrl_TO. Although an input of the first selector 411 is a bit value unit in FIG. 15 for the convenience of illustration, as in the previous example embodiments, data corresponding to one or more bit units, a small block unit, and/or a codeblock unit may be provided as the input of the first selector 411.

Before a timeout occurs, HARQ data may be provided to the combiner 412 via the first selector 411. The combiner 412 may combine retransmitted data (e.g., retransmission data) with the HARQ data to form combined data, and provide the combined data to a first input terminal of the second selector 413. The retransmitted data (e.g., retransmission data) on which the HARQ combining process is not performed may be provided to a second input terminal of the second selector 413.

The second selector 413 may selectively output any one input in response to a retransmission control signal Ctrl_ReTx. For example, the HARQ controller 420 may control an operation processing subsequently retransmitted data as initially transmitted data or retransmitted data in a case when a timeout occurs, according to at least one example embodiment. To this end, the HARQ controller 420 may generate and provide the retransmission control signal Ctrl_ReTx to the second selector 413.

If the timeout occurs when the HARQ data saved in the external memory is fetched, the retransmitted data may be processed as initially transmitted data. In this case, the second selector 413 may selectively output the data on which the HARQ combining is not performed (e.g., the retransmitted data/retransmission data), in response to the retransmission control signal Ctrl_ReTx. Otherwise, if the timeout does not occur or before the timeout occurs, a HARQ combining operation may be performed using the normally fetched HARQ data. In this case, the second selector 413 may selectively output the data on which HARQ combining is performed (e.g., the combined data), in response to the retransmission control signal Ctrl_ReTx.

The data output from the second selector 413 may be saved (and/or temporarily saved) in the fetch buffer 450 via the HARQ buffer controller 430. A CRC check operation of a codeword unit may be performed on the data saved in the fetch buffer 450, and the data saved in the fetch buffer 450 may or may not be moved to the external memory based on the CRC check result.

Figure 16:
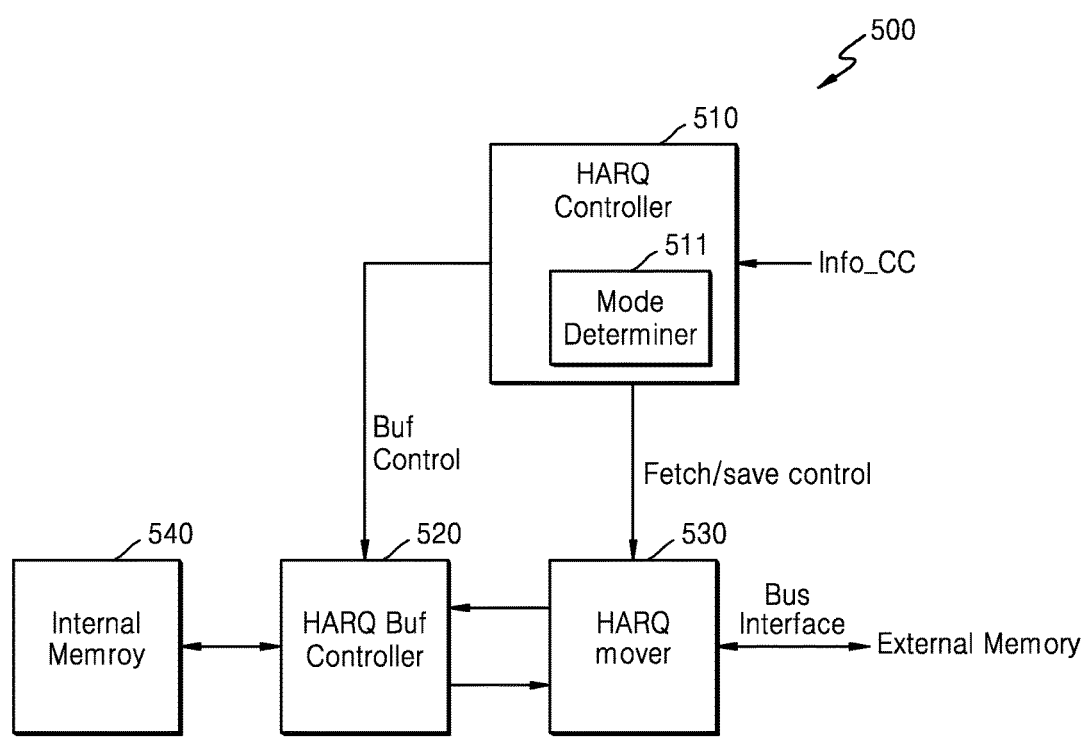
FIG. 16 is a block diagram of an example of a HARQ processing module for saving HARQ data in an internal memory or an external memory based on a communication network structure according to at least one example embodiment of the inventive concepts.

FIG. 16 is a block diagram of an example of a HARQ processing module 500 for saving HARQ data in an internal memory and/or an external memory based on a communication network structure according to at least one example embodiment.

Referring to FIG. 16, the HARQ processing module 500 may include a HARQ controller 510, a HARQ buffer controller 520, a HARQ mover 530, and an internal memory 540, etc. Although not shown in FIG. 16, the HARQ processing module 500 may further include a HARQ combiner for combining HARQ data with retransmitted data according to some example embodiments.

A 4G network, e.g., an LTE network, mostly uses one or two component carriers (CCs), and a larger number of CCs may be used in some cases. For example, an LTE-A communication system may transmit data via five or more CCs, and each CC may include multiple (e.g., eight) parallel HARQ processes.

With regard to the HARQ processes, the amount of HARQ data to be saved is increased in proportion to the number of activated CCs. When an external memory is used, bus complexity is increased and power consumption is also increased. As such, according to at least one example embodiment of the inventive concepts, when the number of activated CCs is equal to or less than a certain number (e.g., a desired number or a threshold number), HARQ data may be saved in the internal memory 540 included in a modem and thus performance degradation due to an increase in bus complexity and power consumption may be reduced. When the number of activated component carriers is greater than the certain number, HARQ data may be selectively saved in the external memory provided outside the modem.

As illustrated in FIG. 16, the HARQ controller 510 may include a mode determiner 511 for selecting a HARQ data save mode by using component carrier information Info_CC indicating the number of activated CCs. A packet transmitted from a transmission system may include information about CCs to which HARQ processes are allocated, and the component carrier information Info_CC may be generated by analyzing the information included in the packet in a combined software and hardware operation. The HARQ controller 510 may output a buffer control signal Buf control for controlling the HARQ buffer controller 520 based on the component carrier information Info_CC. In addition, the HARQ controller 510 may output a fetch/save control signal Fetch/save control for controlling an operation of fetching and saving HARQ data from or in the external memory based on the component carrier information Info_CC.

Figure 17:
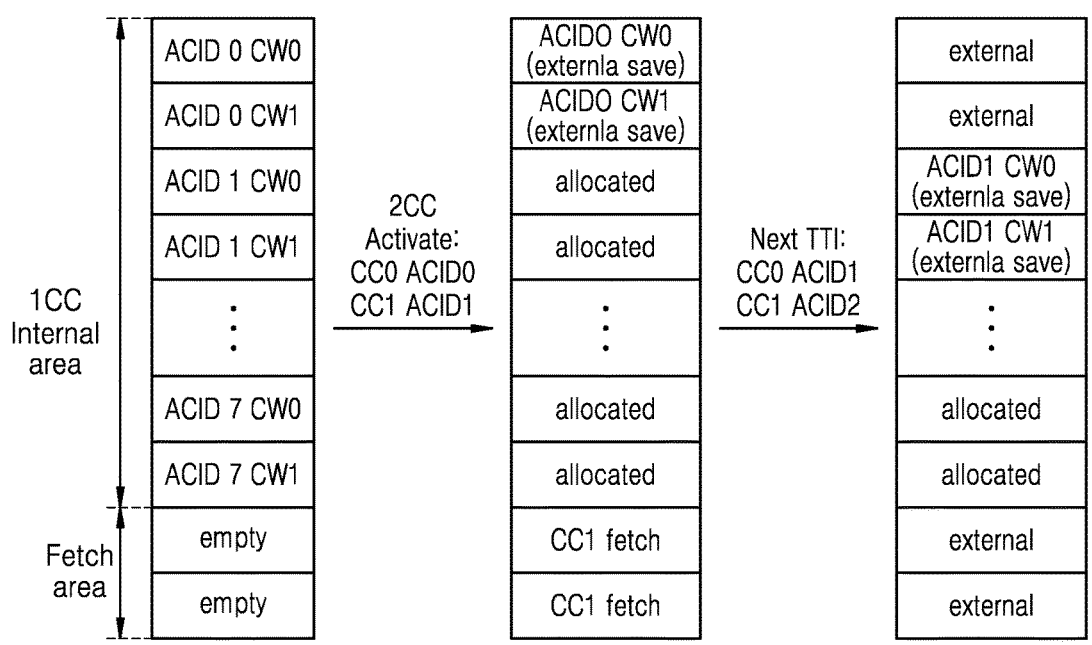
FIG. 17 is a conceptual diagram showing an example in which HARQ data saved in an internal memory is moved to an external memory according to at least one example embodiment of the inventive concepts.

An example of operation of the HARQ processing module 500 illustrated in FIG. 16 is now described with reference to FIG. 17. FIG. 17 is a conceptual diagram showing an example in which HARQ data saved in the internal memory 540 is moved to the external memory according to at least one example embodiment. FIG. 17 shows an example in which the HARQ data is saved in the internal memory 540 if one CC is activated, and is moved to the external memory if two or more CCs are activated.

Referring to FIG. 17, one CC may include a plurality of HARQ channels (e.g., first to eighth HARQ channels ACID0 to ACID7, etc.), and HARQ data corresponding to codewords CW0 and CW1 of the first to eighth HARQ channels ACID0 to ACID7, which are transmitted at a first TTI, may be saved in the internal memory 540. The internal memory 540 may further include a space for saving HARQ data fetched from the external memory.

When data is transmitted via one component carrier (e.g., CC0) as described above, the internal memory 540 may save the HARQ data. Thereafter, the settings may be changed from one CC to two CCs at a second TTI, data of the component carrier CC0 retransmitted from a transmission system may be combined with the HARQ data saved in the internal memory 540, and the combined data may be moved to the external memory. The example embodiment of FIG. 17 shows an example in which HARQ data corresponding to two codewords CW0 and CW1 of the first HARQ channel ACID0 is moved to the external memory, and thus the codewords CW0 and CW1 of the first HARQ channel ACID0 may be removed from the internal memory 540, but the example embodiments are not limited thereto.

Data of another component carrier (e.g., CC1) transmitted from the transmission system may be saved and/or temporarily saved in a fetch area of the internal memory 540, and a CRC check operation according to at least one example embodiment may be performed to save and/or selectively save HARQ data in the external memory.

Thereafter, at a third TTI, multiple pieces of HARQ data may be sequentially moved to the external memory as described above. At the third TTI, a HARQ process may be performed on HARQ data corresponding to two codewords CW0 and CW1 of the second HARQ channel ACID1, and the HARQ data based on the HARQ process may be moved to the external memory. In this manner, all HARQ data saved in the internal memory 540 may be moved to the external memory. When the number of component carriers is increased, HARQ data may also be saved in the external memory.

According to the above-described example embodiments, when component carriers are additionally activated for communication with the transmission system, HARQ data may be moved to the external memory in a HARQ process without resetting the modem to initialize HARQ information, and thus degradation in HARQ performance may be reduced and/or prevented.

Figure 18:
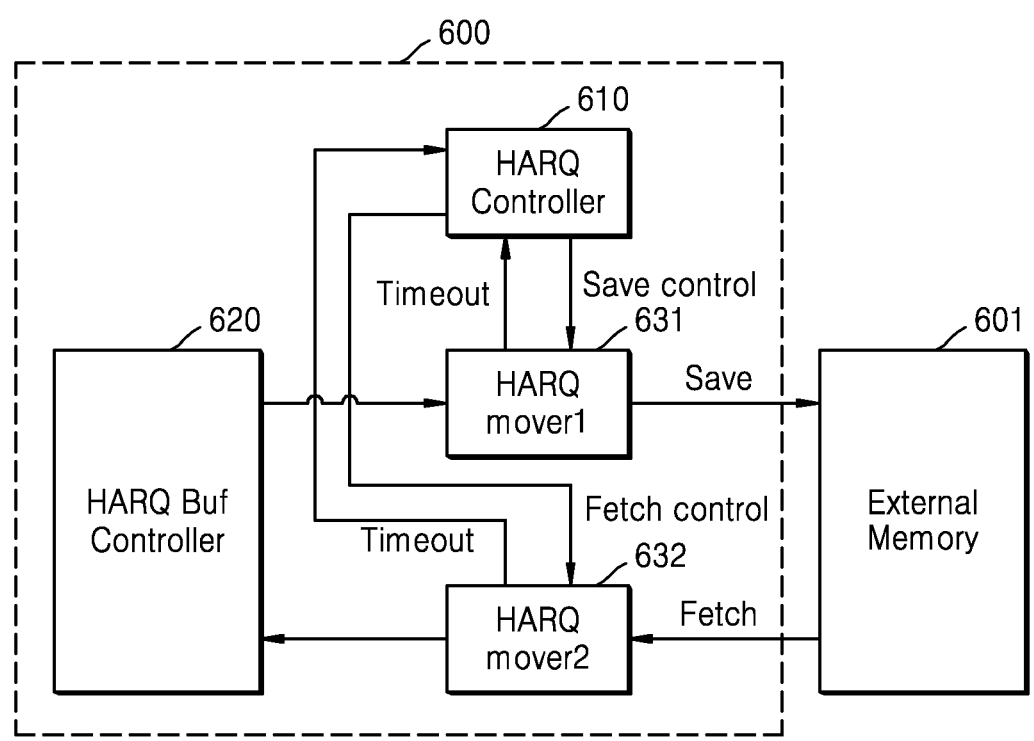
FIG. 18 is a block diagram of a modem according to at least one example embodiment of the inventive concepts.

FIG. 18 is a block diagram of a modem according to at least one example embodiment of the inventive concepts. As illustrated in FIG. 18, the modem may include a HARQ processing module 600. According to at least one example embodiment, HARQ data may be saved in an external memory 601 provided outside the modem. The HARQ processing module 600 may include a HARQ controller 610, a HARQ buffer controller 620, and first and second HARQ movers 631 and 632, but is not limited thereto. When the configuration and operation of the HARQ processing module 600 illustrated in FIG. 18 are described, the descriptions already given above in the afore-described example embodiments are not provided herein.

Referring to FIG. 18, according to some example embodiments, the HARQ processing module 600 includes the first and second HARQ movers 631 and 632 to reduce and/or prevent conflicts between HARQ data fetch and HARQ data save operations. For example, the first HARQ mover 631 may perform an operation of saving HARQ data in the external memory 601, and the second HARQ mover 632 may perform an operation of fetching the HARQ data from the external memory 601. According to at least one example embodiment, conflicts between the HARQ data fetch and HARQ data save operations may be reduced and/or prevented and thus a bus delay associated with a shared bus for accessing the external memory 601 may be reduced. Like or similarly to the afore-described example embodiments, the HARQ processing module 600 illustrated in FIG. 18 may perform a HARQ process based on a CRC check result of a codeword unit and/or a timeout determination result.

Figure 19:
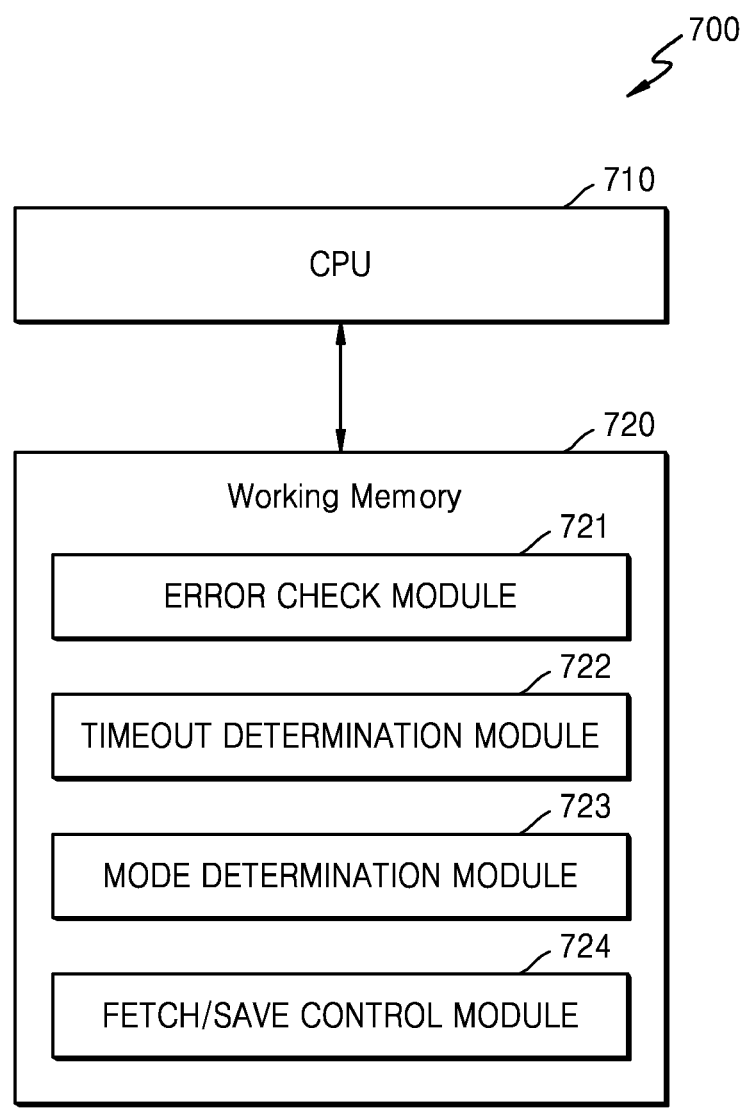
FIG. 19 is a block diagram showing an example in which a modem performs a HARQ process in a software manner, according to at least one example embodiment of the inventive concepts.

FIG. 19 is a block diagram showing an example in which a modem 700 performs a HARQ process in a software manner, according to at least one example embodiment of the inventive concepts.

The above-described various functions of a HARQ processing module may be performed by using a combination of hardware and software. To perform at least a part of the above-described various functions of the HARQ processing module in a software manner, the modem 700 may include a CPU 710 and a working memory 720. The working memory 720 may be a non-transitory computer-readable storage medium and may be configured as one of various types of non-transitory storage media such as random access memory (RAM), non-volatile memory (e.g., flash memory), read-only memory (ROM), electrically erasable programmable read-only memory (EEPROM), a magnetic disc storage device, etc. The working memory 720 may store one or more modules including a program (e.g., computer readable instructions) for performing each function. For example, the working memory 720 may store an error check module 721, a timeout determination module 722, a mode determination module 723, and a fetch/save control module 724, etc. However, the above-mentioned modules are merely examples, and the working memory 720 may store only a part of the modules illustrated in FIG. 19 or further store other modules related to HARQ processing.

The various functions according to the example embodiments may be performed by executing using at least one processor the various modules of the working memory 720. For example, a CRC check operation of a codeword unit and a CRC check operation of a codeblock unit may be performed by executing the error check module 721, and HARQ data may be saved in an external memory based on the CRC check results by executing the fetch/save control module 724. It may be determined whether a timeout occurs when the external memory is accessed, by executing the timeout determination module 722, various modes related to data communication (e.g., communication modes based on the number of activated component carriers) may be determined by executing the mode determination module 723, and thus a HARQ data save operation may be controlled.

Figure 20:
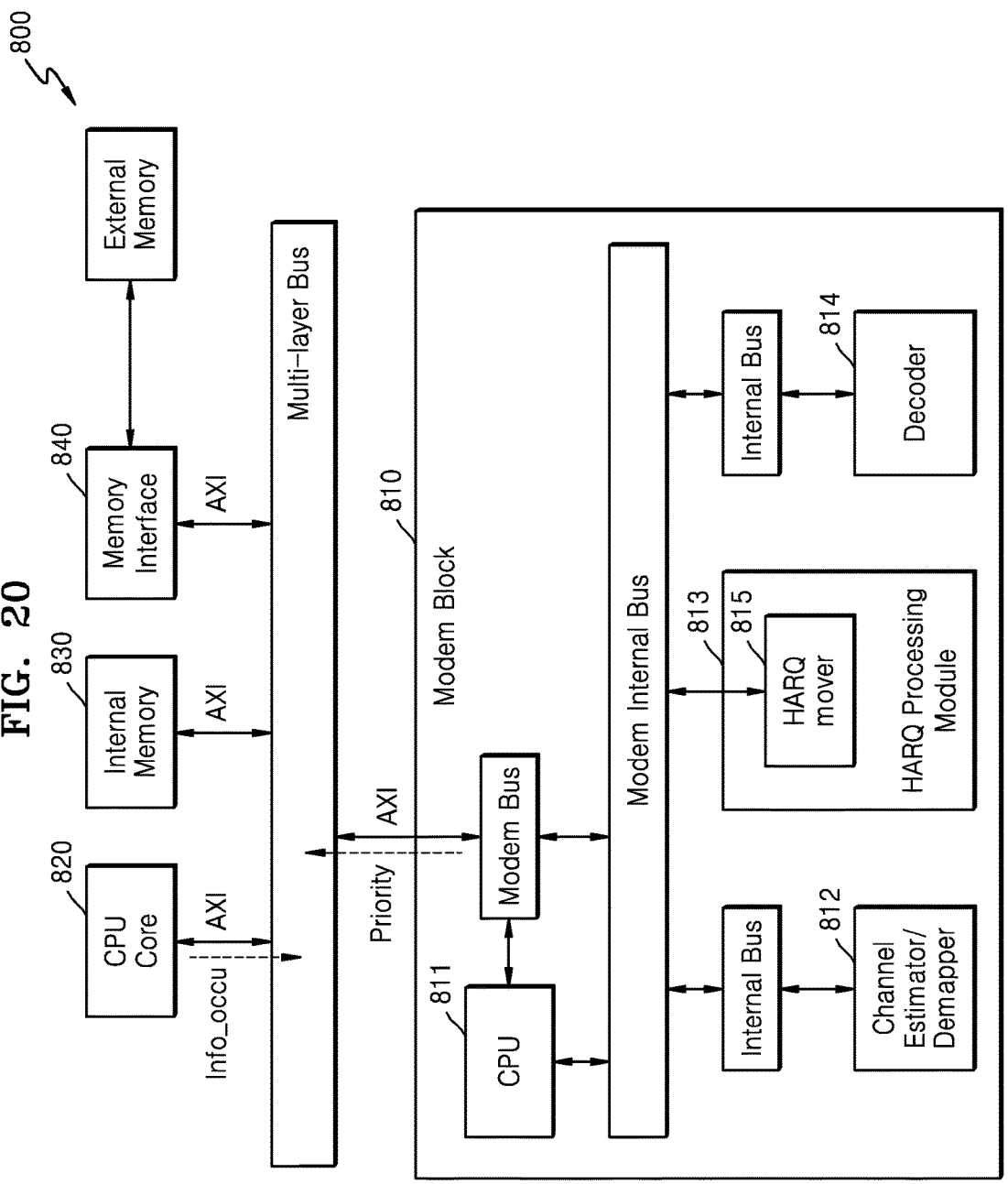
FIG. 20 is a block diagram of an application processor into which functions of a modem chip are integrated, according to at least one example embodiment of the inventive concepts.

FIG. 20 is a block diagram of an application processor into which functions of a modem chip are integrated, according to at least one example embodiment of the inventive concepts. The application processor of FIG. 20 may be referred to as a modem application processor (ModAP) because functions of a modem chip are integrated thereinto.

Referring to FIG. 20, the application processor 800 may be configured as a system on chip (SoC) and include a modem block 810, a CPU core 820, an internal memory 830, and a memory interface 840, but the example embodiments are not limited thereto. Similar to at least some of the other example embodiments, the modem block 810 may include a CPU 811 for controlling overall operations of the modem block 810, a channel estimator/demapper 812 for performing channel estimation and demapping functions, a HARQ processing module 813 for performing HARQ processing, and a decoder 814, etc., but the example embodiments are not limited thereto. The HARQ processing module 813 may include various elements connected via a modem internal bus, e.g., a HARQ mover 815 in FIG. 20.

The CPU core 820 may control functions of the application processor 800 by executing various programs (e.g., computer readable instructions). The internal memory 830 may temporarily save HARQ data saved in and/or fetched from an external memory, according to at least one example embodiment, or HARQ data may be separately allocated to and saved in the internal memory 830 and the external memory. The memory interface 840 may interface with the external memory, save HARQ data received from the HARQ mover 815, in the external memory according to some example embodiments of the inventive concepts, and fetch HARQ data from the external memory to provide the HARQ data to the HARQ mover 815.

Various elements of the application processor 800 may be interconnected based on a system bus. For example, as a standard bus specification of the system bus, such as an advanced microcontroller bus architecture (AMBA) protocol of Advanced RISC Machines Ltd. (ARM) may be used. Bus types of the AMBA protocol may include advanced high-performance bus (AHB), advanced peripheral bus (APB), advanced extensible interface (AXI), AXI4, AXI coherency extensions (ACE), etc. For example, in FIG. 20, the system bus is configured as a multi-layer bus and AXI is used as a standard bus specification.

According to at least one example embodiment, the external memory may be accessed via the system bus and the memory interface 840, and various types of information about access of the external memory may be transmitted and received between the modem block 810 and the other elements of the application processor 800. For example, the CPU core 820 may provide information Info_occu about external memory occupation via the system bus, and the modem block 810 may provide priority information priority about external memory occupation via the system bus. That is, the modem block 810 may control whether and/or when to access the external memory based on the information received from the CPU core 820, and the CPU core 820 may control whether and/or when to access the external memory based on the information received from the modem block 810. Differently from the ModAP illustrated in FIG. 20, even when an application processor and a modem chip are configured as separate semiconductor chips interconnected via a shared bus, various types of information may be transmitted and received between the application processor and the modem chip and accessed to the external memory may be controlled based on the information as described above according to some example embodiments.

Using a modem chip, an application processor including the modem chip, and an operating method of the modem chip, according to the inventive concepts, since HARQ data is efficiently saved in an internal memory and an external memory, a memory size may be reduced and HARQ performance may be improved.

In addition, since the concept of a timeout is employed in an operation of accessing the external memory, performance degradation of the modem chip and peripheral devices due to a long occupation time of a shared bus may be reduced and/or prevented.

While the inventive concepts has been particularly shown and described with reference to example embodiments thereof, it will be understood that various changes in form and details may be made therein without departing from the spirit and scope of the following claims.

As is traditional in the field of the inventive concepts, various example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar processing devices, they may be programmed using software (e.g., microcode) to perform various functions discussed herein and may optionally be driven by firmware and/or software, thereby transforming the microprocessor or similar processing devices into a special purpose processor. Additionally, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

What is claimed is:

1. A modem chip for receiving data, the data including at least one codeword unit, the codeword unit including a plurality of codeblock units, the modem chip comprising:
    a hybrid automatic repeat request (HARQ) controller configured to control HARQ data, the HARQ data including at least one codeword unit, to be saved in an external memory based on an error detection result associated with the codeword unit;
    a HARQ mover configured to save or fetch the HARQ data of the codeword unit in or from the external memory via a bus interface; and
    a HARQ combiner configured to combine retransmission data with the HARQ data fetched from the external memory.

2. The modem chip of claim 1, wherein the HARQ controller is further configured to control the HARQ mover to save the HARQ data in the external memory based on an error detection result associated with the codeblock units.

3. The modem chip of claim 2, wherein, when an error is detected from at least one of the codeblock units and the codeword unit, the HARQ controller is further configured to control the HARQ mover to save the HARQ data in the external memory.

4. The modem chip of claim 1, wherein the HARQ controller is further configured to determine whether to save the HARQ data based on a cyclic redundancy check (CRC) check result of the codeword unit.

5. The modem chip of claim 4, wherein
    the data includes a plurality of codeword units; and
    the HARQ controller is further configured to control the HARQ mover to save HARQ data corresponding to a codeword unit having a CRC check error among the plurality of codeword units of the data in the external memory.

6. The modem chip of claim 1, further comprising:
    a fetch buffer configured to saving the HARQ data fetched from the external memory; and
    a HARQ buffer controller configured to control transmission of the HARQ data between the HARQ combiner and the fetch buffer.

7. The modem chip of claim 1, wherein the HARQ controller is further configured to:
  determine whether a timeout occurs when the HARQ data is fetched from or saved in the external memory; and
  control a HARQ combining operation of the HARQ combiner based on a result of the determination.

8. The modem chip of claim 7, wherein the HARQ controller is further configured to:
  determine that the timeout occurs when the HARQ data is not completely fetched within a desired time period after the HARQ mover starts fetching the HARQ data; and
  when the timeout occurs, control the HARQ combiner to process retransmitted data as initially transmitted data.

9. The modem chip of claim 7, wherein the HARQ controller is further configured to:
  determine that the timeout occurs when the codeblock unit of the HARQ data is not completely fetched prior to a HARQ process beginning on data of the codeblock unit; and
  when the timeout occurs, perform a HARQ combining operation using HARQ data of a codeblock unit completely fetched before the timeout occurs.

10. The modem chip of claim 7, wherein the HARQ controller is further configured to:
  determine that the timeout occurs when the HARQ data is not completely saved within a desired time after the HARQ mover starts to save the HARQ data; and
  when the timeout occurs, control the HARQ combiner to process the retransmitted data as initially transmitted data.

11. The modem chip of claim 1, wherein the HARQ controller is further configured to save the HARQ data based on a result of determining a number of component carriers used for data communication with an external transmission system.

12. The modem chip of claim 11, further comprising an internal memory configured to save the HARQ data; and
  wherein the HARQ controller is further configured to,
    save the HARQ data in the internal memory upon determining that one component carrier is activated, and
    save the HARQ data in the external memory upon determining that two or more component carriers are activated.

13. The modem chip of claim 1, wherein the HARQ mover is configured to access the external memory via a bus shared with at least one peripheral device.

14. A modem chip for accessing an external memory, the modem chip comprising:
  a hybrid automatic repeat request (HARQ) mover configured to save or fetch HARQ data in or from the external memory via a bus interface with the external memory;
  a HARQ combiner configured to combine retransmitted data with the HARQ data fetched from the external memory; and
  a HARQ controller configured to,
    determine whether a timeout occurs when the external memory is accessed, and
    control a HARQ combining operation of the HARQ combiner based on a result of the determination.

15. The modem chip of claim 14, wherein the HARQ controller is further configured to:
  determine whether a timeout occurs when the HARQ data is fetched from the external memory; and
  upon determining that the timeout occurs, control the HARQ combiner to skip a HARQ combining operation on the retransmitted data with the HARQ data having the timeout before being completely fetched.

16. The modem chip of claim 14, wherein the HARQ controller is further configured to:
  determine whether a timeout occurs when the HARQ data is fetched from the external memory; and
  upon determining that the timeout occurs, control the HARQ combiner to perform a HARQ combining operation on a part of the HARQ data that is completely fetched before the timeout occurs.

17. The modem chip of claim 14, wherein the HARQ controller is further configured to:
  determine whether a timeout occurs when the HARQ data is saved in the external memory; and
  upon determining that the timeout occurs, control the HARQ combiner to skip a HARQ combining operation on the retransmitted data with the HARQ data having the timeout before being completely saved.

18. A modem chip comprising:
  an internal memory having a storage capacity smaller than an external memory; and
  at least one processor configured to execute computer readable instructions to,
    receive a transmission of data from a transmission source, the data having a length of at least one codeword unit;
    perform an error correction operation on the received data; and
    save the data as a first HARQ data in the internal memory or in the external memory based on results of the error correction operation performed on the data.

19. The modem chip of claim 18, wherein the at least one processor is further configured to save the data by:
  saving the first HARQ data in the external memory when results of the error correction operation indicate that an error exists in the data; and
  saving the first HARQ data in the internal memory when the results of the error correction operation indicate no errors exist in the data.

20. The modem chip of claim 18, wherein the at least one processor is further configured to:
  fetch the first HARQ data as a second HARQ data from the external memory;
  determine whether a timeout occurs during the fetching;
  save at least one codeblock of the second HARQ data in a fetch buffer included in the internal memory; and
  based on results of the timeout determination, combine the second HARQ data with retransmission HARQ data using the saved at least one codeblock of the HARQ data stored in the fetch buffer.

* * * * *